United States Patent
Tsunoda

(10) Patent No.: US 7,670,710 B2
(45) Date of Patent: *Mar. 2, 2010

(54) FUEL CELL AND FUEL CELL STACK WITH PRESSURE CHAMBERS

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 1077 days.

This patent is subject to a terminal disclaimer.

(21) Appl. No.: 11/016,385

(22) Filed: Dec. 17, 2004

(65) Prior Publication Data

US 2005/0136294 A1     Jun. 23, 2005

(30) Foreign Application Priority Data

Dec. 17, 2003 (JP) .............................. 2003-419805

(51) Int. Cl.
*H01M 2/14* (2006.01)
*H01M 8/10* (2006.01)
*H01M 8/00* (2006.01)
*H01M 2/00* (2006.01)

(52) U.S. Cl. ............................. 429/39; 429/12; 429/32; 429/34; 429/38

(58) Field of Classification Search ........................ None
See application file for complete search history.

(56) References Cited

U.S. PATENT DOCUMENTS

| 5,770,327 | A | 6/1998 | Barnett et al. | |
| 6,361,892 | B1 | 3/2002 | Ruhl et al. | |
| 7,001,684 | B2 * | 2/2006 | Doshi et al. | 429/34 |

| 2005/0221161 | A1 | 10/2005 | Komada et al. |

FOREIGN PATENT DOCUMENTS

| EP | 0714147 B1 | 5/1996 |
| EP | 1482585 A1 | 12/2004 |
| JP | 60-097554 | 5/1985 |
| JP | 4-62756 | 2/1992 |
| JP | 11-16581 | 1/1999 |
| JP | 2001-068132 | 3/2001 |
| JP | 2002-151106 | 5/2002 |
| WO | WO 03/075384 A1 | 9/2003 |

OTHER PUBLICATIONS

On-line translation of JP 2002-151106, May 24, 2002.*
Japanese Office Action for Application No. 2003-419805, dated Feb. 19, 2008.
Japanese Office Action for Application No. 10-2006-7011967, dated Mar. 17, 2007.
International Search Report for Application No. PCT/JP2004/019268, dated Jun. 20, 2006.

* cited by examiner

*Primary Examiner*—Dah-Wei D Yuan
*Assistant Examiner*—Katherine Turner
(74) *Attorney, Agent, or Firm*—Lahive & Cockfield, LLP; Anthony A. Laurentano, Esq.

(57) ABSTRACT

A fuel cell includes an electrolyte electrode assembly and separators. The separator includes first through third plates which are stacked together. A fuel gas channel connected to a fuel gas supply passage is formed between the first and third plates. The fuel gas channel forms a fuel gas pressure chamber between the first and third circular disks. Further, an oxygen-containing gas channel connected to an oxygen-containing gas supply passage is formed between the second and third plates. The oxygen-containing gas channel forms an oxygen-containing gas pressure chamber between the second and third circular disks.

7 Claims, 21 Drawing Sheets

⇒ OXYGEN-CONTAINING GAS
⇒ FUEL GAS
⇒ EXHAUST GAS

--→ FUEL GAS
—→ OXYGEN-CONTAINING GAS

⟹ OXYGEN-CONTAINING GAS
⟹ FUEL GAS
⟹ EXHAUST GAS

FUEL CELL AND FUEL CELL STACK WITH PRESSURE CHAMBERS

BACKGROUND OF THE INVENTION

1. Field of the Invention

The present invention relates to a fuel cell formed by stacking an electrolyte electrode assembly and separators alternately. The electrolyte electrode assembly includes an anode, a cathode, and an electrolyte interposed between the anode and the cathode. Further, the present invention relates to a fuel cell stack formed by stacking the fuel cells.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined numbers of the unit cells and the separators are stacked together to form a fuel cell stack.

In the fuel cell, an oxygen-containing gas or air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

For example, the electric energy generated in the electrolyte electrode assembly is transmitted to terminal plates through a current collector provided in the separator. Therefore, the desired contact state between the current collector and the electrolyte electrode assembly needs to be maintained. However, variation in the height of the current collector or the thickness of the electrolyte electrode assembly occurs easily due to factors such as fabrication accuracy. In particular, since the rigidity of the current collector is high, the electrolyte electrode assembly may be damaged undesirably.

In an attempt to address the problem, for example, Japanese Laid-Open Patent Publication No. 2001-68132 discloses a solid oxide fuel cell. As shown in FIG. 21, according to the disclosure of Japanese Laid-Open Patent Publication No. 2001-68132, a plurality of solid oxide fuel cells 1 are stacked together. The solid oxide fuel cell 1 includes a flat unit cell 2, a first spacer 3, a second spacer 4, and a current collecting plate 5. The current collecting plate 5 includes a flat metal plate 6, and metal thin plates 7 provided on both surfaces of the flat metal plate 6. Projections 7a are formed on the metal thin metal plates 7. The projections 7a contact the surface of a fuel electrode or an air electrode of the unit cell 2.

According to the disclosure, the projections 7a have the suitable elasticity. Therefore, even if an excessive force is applied to the projections 7a, the projections 7a are deformed suitably, and absorb the applied load for preventing the damage of the fuel electrode or the air electrode which contacts the projections 7a.

However, in Japanese Laid-Open Patent Publication No. 2001-68132, the current collecting plate 5 includes the flat metal plate 6 and the metal thin plates 7 attached on both surfaces of the flat metal plate 6. The metal thin plates 7 provided on both surfaces of the metal plate 6 have the projections 7a, respectively. Since the thin metal plates 7 have the elasticity, the surface pressure is small at portion of the current collector which is deformed to a small extent, and the surface pressure is large at portion of the current collector which is deformed to a large extent. Thus, the surface pressure in the current collector is not uniform.

Further, though the elasticity of the thin metal plates 7 is utilized, the elasticity may be lowered by the influence of heat or the like. Thus, the desired stress absorption function may not be achieved.

Further, deformation of the metal thin plates 7 due to the change in the elasticity would result in the non-uniform shapes of the respective fluid passages. In this case, it is difficult to achieve the uniform flows of the reactant gases or the like.

SUMMARY OF THE INVENTION

A general object of the present invention is to provide a fuel cell and a fuel cell stack having a simple and compact structure in which the uniform surface pressure between an electrolyte electrode assembly and a current collector is maintained, and flows of reactant gas or the like are uniform.

According to the present invention, an electrolyte electrode assembly and separators are stacked alternately. The electrolyte electrode assembly includes an anode, a cathode, and an electrolyte interposed between the anode and the cathode. The separator includes first and second plates which are stacked together. A fuel gas channel for supplying a fuel gas to the anode, and an oxygen-containing gas channel for supplying an oxygen-containing gas to the cathode are formed between the first and second plates.

The fuel gas channel is provided over an electrode surface of the anode, and the first plate is interposed between the fuel gas channel and the anode to form a fuel gas pressure chamber such that the first plate tightly contacts the anode under pressure when the fuel gas is supplied into the fuel gas pressure chamber. The oxygen-containing gas channel is provided over an electrode surface of the cathode, and the second plate is interposed between the oxygen-containing gas channel and the cathode to form an oxygen-containing gas pressure chamber such that the second plate tightly contacts the cathode under pressure when the oxygen-containing gas is supplied into the oxygen-containing gas pressure chamber.

Further, it is preferable that the first plate has a fuel gas inlet for supplying the fuel gas from the fuel gas pressure chamber toward a central region of the anode, and the second plate has an oxygen-containing gas inlet for supplying the oxygen-containing gas from the oxygen-containing gas pressure chamber the toward a central region of the cathode.

Further, it is preferable that a third plate is provided between the first and second plates for dividing a space between the first and second plates into the fuel gas channel and the oxygen-containing gas channel.

Further, it is preferable that a fuel gas distribution passage for connecting a fuel gas supply passage and the fuel gas channel is formed between the first and third plates, and the fuel gas before consumption is supplied through the fuel gas supply passage in the stacking direction of the electrolyte electrode assembly and the separators, and it is preferable that an oxygen-containing gas distribution passage for connecting an oxygen-containing gas supply passage and the oxygen-containing gas channel is formed between the second and third plates, and the oxygen-containing gas before consumption is supplied through the oxygen-containing gas supply passage in the stacking direction.

Further, it is preferable that the separator further comprises an exhaust gas channel for discharging the oxygen-containing gas and the fuel gas supplied to, and consumed in reactions in the electrolyte electrode assembly as an exhaust gas into the stacking direction of the electrolyte electrode assembly and the separators, and a fuel gas channel member for forming the fuel gas channel and supporting the electrolyte electrode assembly, and an oxygen-containing gas channel member for forming the oxygen-containing gas channel and supporting the electrolyte electrode assembly are formed in the exhaust gas channel.

Further, it is preferable that the first and second plates include first and second protrusions protruding in different directions, and the first protrusion of one of the separators and the second protrusion of the other of the separators sandwich the electrolyte electrode assembly. Further, it is preferable that the first and second protrusions function as current collectors for collecting electric energy generated in the electrolyte electrode assembly.

Further, it is preferable that the third plate has a third protrusion protruding toward the first plate.

According to the present invention, when the fuel gas supplied to the fuel gas channel flows into the fuel gas pressure chamber, the internal pressure in the fuel gas pressure chamber is increased, and the fuel gas pressure chamber is expanded such that the first plate tightly contacts the anode under pressure. Likewise, when the oxygen-containing gas supplied to the oxygen-containing gas channel flows into the oxygen-containing gas pressure chamber, the internal pressure in the oxygen-containing gas pressure chamber is increased, and the oxygen-containing gas pressure chamber is expanded such that the second plate tightly contacts the cathode under pressure.

Therefore, dimensional variations of the separator and the electrolyte electrode assembly are absorbed. With the simple and compact structure, it is possible to maintain the uniform surface pressure applied between the electrolyte electrode assembly and the first and second plates as the current collectors. Further, the current collectors tightly contact the entire surfaces of the electrodes of the electrolyte electrode assembly with the uniform surface pressure. The contact resistances of the current collectors are reduced. Thus, improvement in the power generation efficiency is achieved easily.

Further, since the excessive surface pressure is not locally applied to the electrolyte electrode assembly, the damage of the electrolyte electrode assembly is prevented desirably. Further, the required surface pressure for tightening the electrolyte electrode assemblies is generated without any external tightening means.

Moreover, uniform shapes of the respective fluid passages formed between the electrolyte electrode assembly and current collectors are maintained. Thus, the flows of the reactant gases or the like are uniform, and improvement in the power generation efficiency is achieved.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
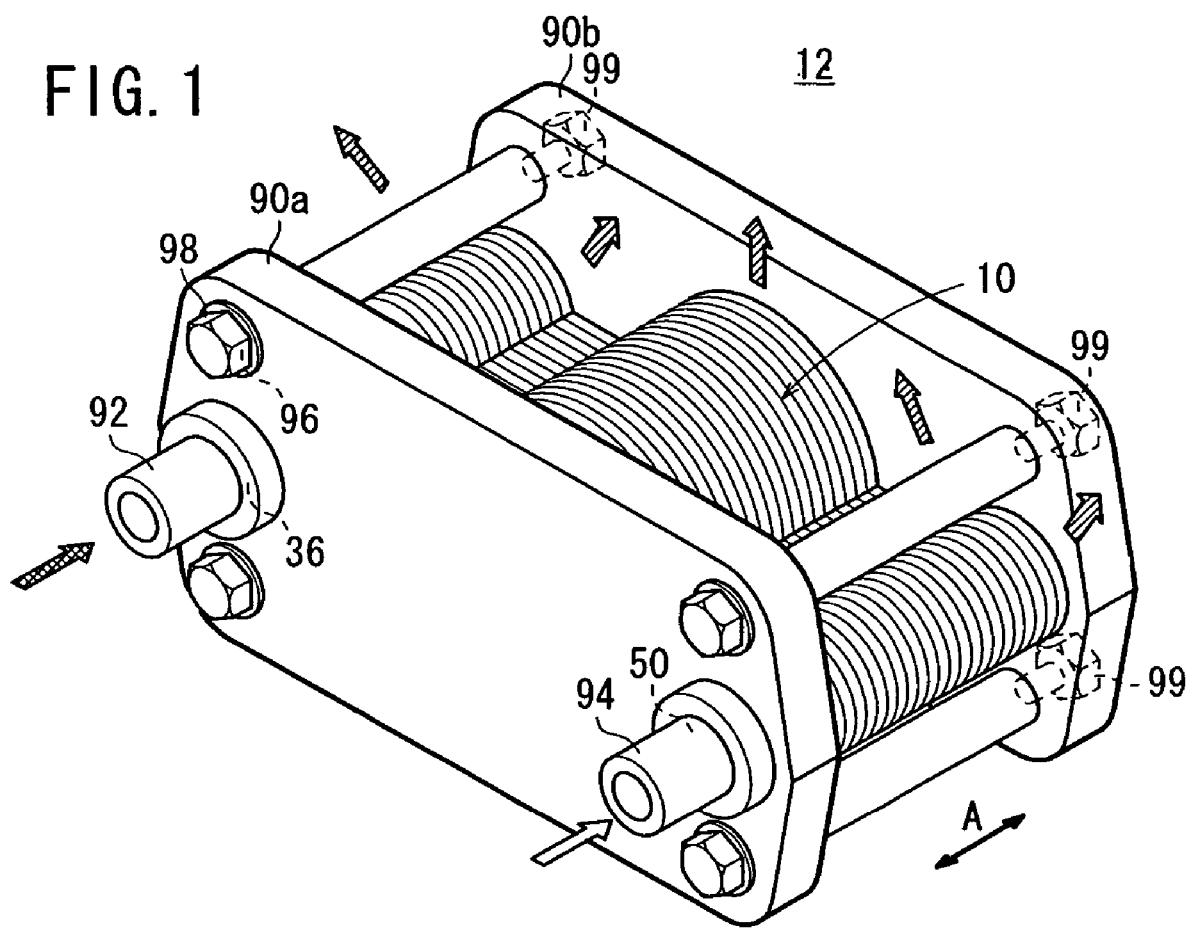
FIG. 1 is a perspective view schematically showing a fuel cell stack formed by stacking a plurality of fuel cells according to a first embodiment of the present invention.

FIG. 1 is a perspective view schematically showing a fuel cell stack 12 formed by stacking a plurality of fuel cells 10 according to a first embodiment of the present invention in a direction indicated by an arrow A.

Figure 2:
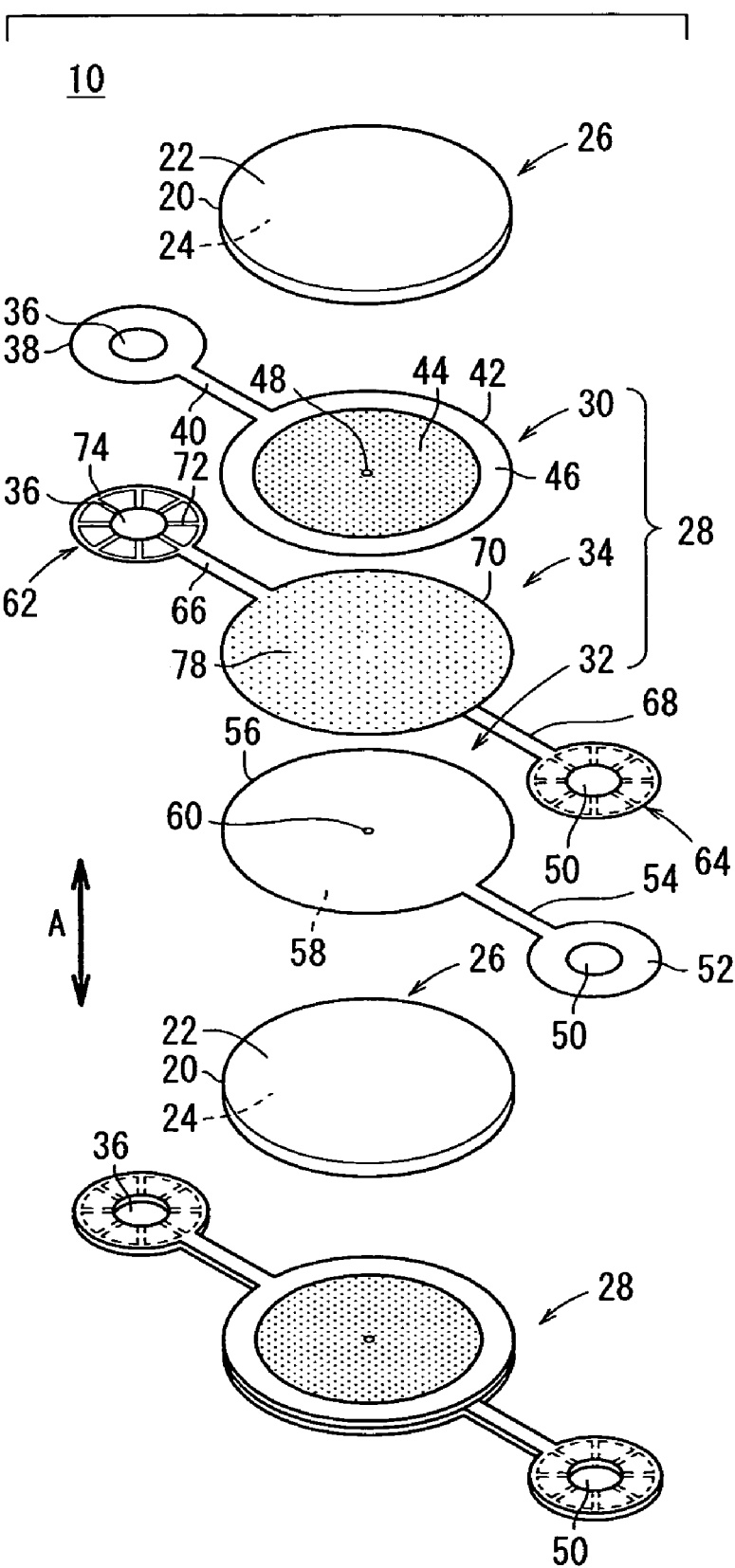
FIG. 2 is an exploded perspective view showing the fuel cell.
Figure 3:
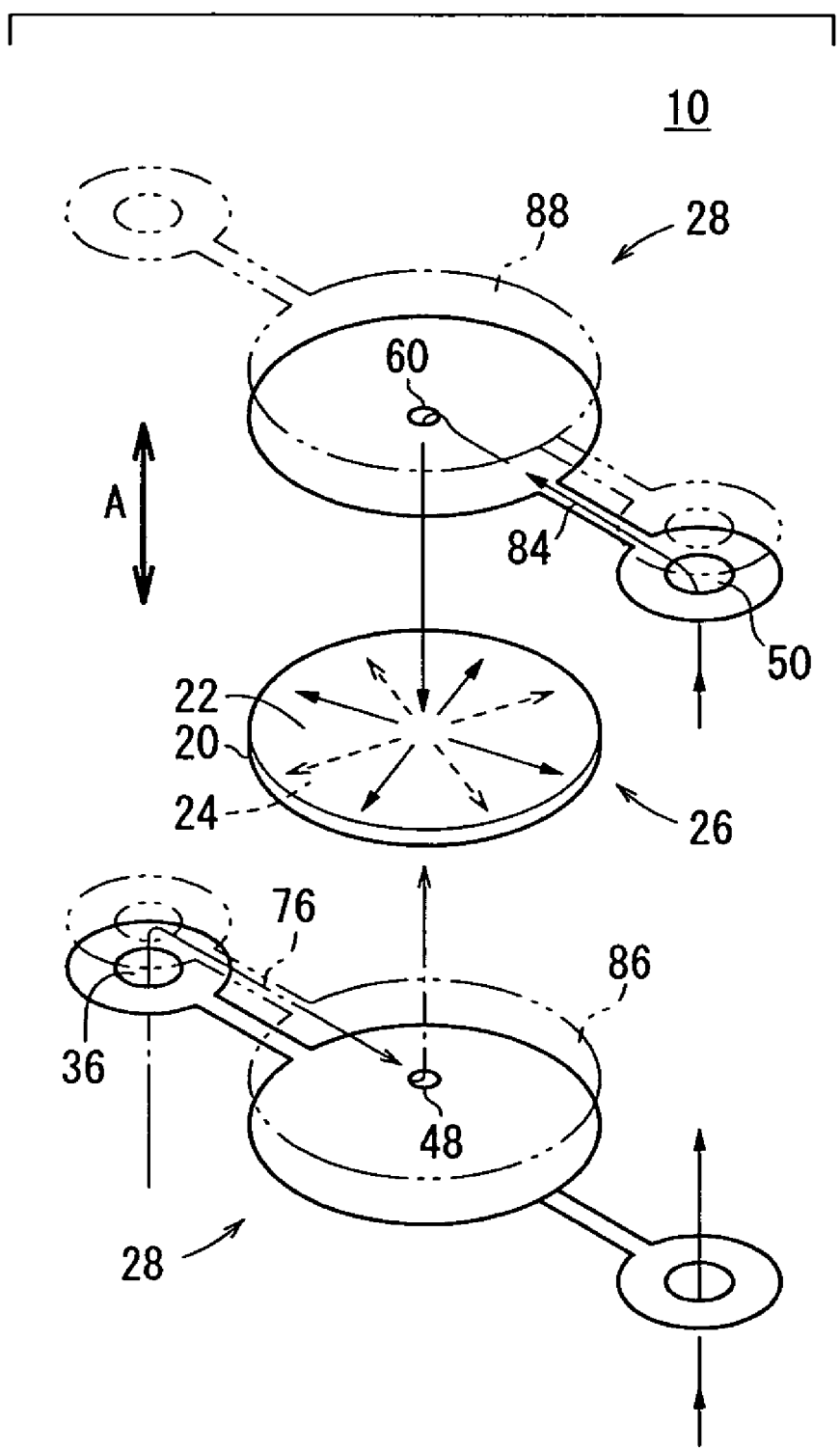
FIG. 3 is a partial exploded perspective view showing gas flows in the fuel cell.

The fuel cell 10 is a solid oxide fuel cell (SOFC) used in various applications, including stationary and mobile applications. The fuel cell 10 is mounted on a vehicle. As shown in FIGS. 2 and 3, the fuel cell 10 includes an electrolyte electrode assembly 26. The electrolyte electrode assembly 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape.

The fuel cell 10 is formed by sandwiching the electrolyte electrode assembly 26 between a pair of separators 28. The separator 28 includes first and second plates 30, 32, and a third plate 34 interposed between the first and second plates 30, 32. For example, the first through third plates 30, 32, 34 are metal plates of, e.g., stainless alloy. The first plate 30 and the second plate 32 are joined to both surfaces of the third plate 34 by brazing, for example.

As shown in FIG. 2, the first plate 30 has a first small diameter end portion 38. A fuel gas supply passage 36 for supplying a fuel gas in the direction indicated by the arrow A extends through the first small diameter end portion 38. The first small diameter end portion 38 is integral with a first circular disk 42 having a relatively large diameter through a narrow bridge 40. The first circular disk 42 and the anode 24 of the electrolyte electrode assembly 26 have substantially the same size.

A large number of first protrusions 44 are formed on a surface of the first circular disk 42 which contacts the anode 24, in a central region adjacent to an outer circumferential region. A substantially ring shaped protrusion 46 is provided on the outer circumferential region of the first circular disk 42. The first protrusions 44 and the substantially ring shaped protrusion 46 jointly functions as a current collector. A fuel gas inlet 48 is provided at the center of the first circular disk 42 for supplying the fuel gas toward substantially the central region of the anode 24. The first protrusions 44 may be formed by making a plurality of recesses in a surface which is in the same plane with the surface of the substantially ring shaped protrusion 46.

The second plate 32 has a second small diameter end portion 52. An oxygen-containing gas supply passage 50 for supplying an oxygen-containing gas in the direction indicated by the arrow A extends through the second small diameter end portion 52. The second small diameter end portion 52 is integral with a second circular disk 56 having a relatively large diameter through a narrow bridge 54.

Figure 4:
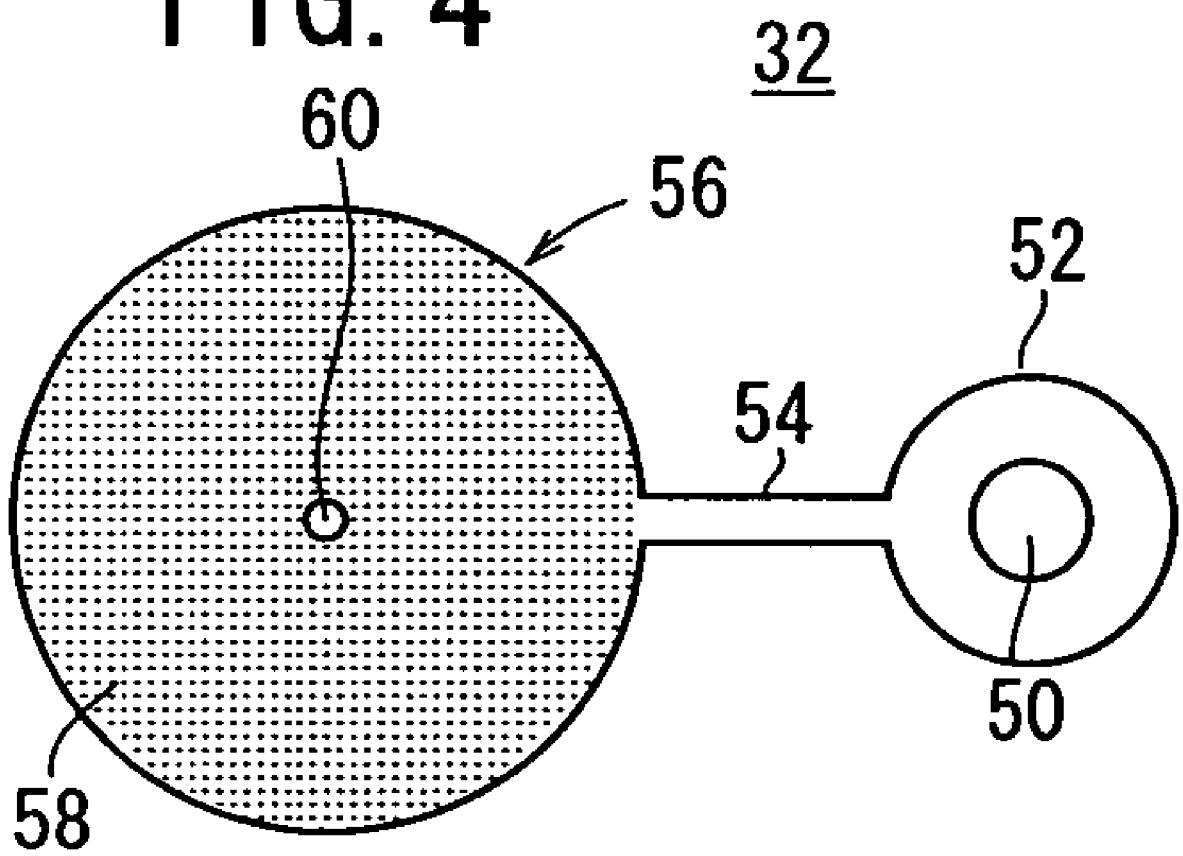
FIG. 4 is a front view showing a second plate of the fuel cell.

As shown in FIG. 4, a plurality of second protrusions 58 are formed on the entire surface of the second circular disk 56 which contacts the cathode 22 of the electrolyte electrode assembly 26. The second protrusions 58 function as a current collector. An oxygen-containing gas inlet 60 is provided at the center of the second circular disk 56 for supplying the oxygen-containing gas toward substantially the central region of the cathode 22.

As shown in FIG. 2, the third plate 34 includes a third small diameter end portion 62 and a fourth small diameter end portion 64. The fuel gas supply passage 36 extends through the third small diameter end portion 62, and the oxygen-containing gas supply passage 50 extends through the fourth small diameter end portion 64. The third and fourth small diameter end portions 62, 64 are integral with a third circular disk 70 having a relatively large diameter through narrow bridges 66, 68, respectively. The first through third circular disks 42, 56, 70 have the same diameter.

Figure 5:
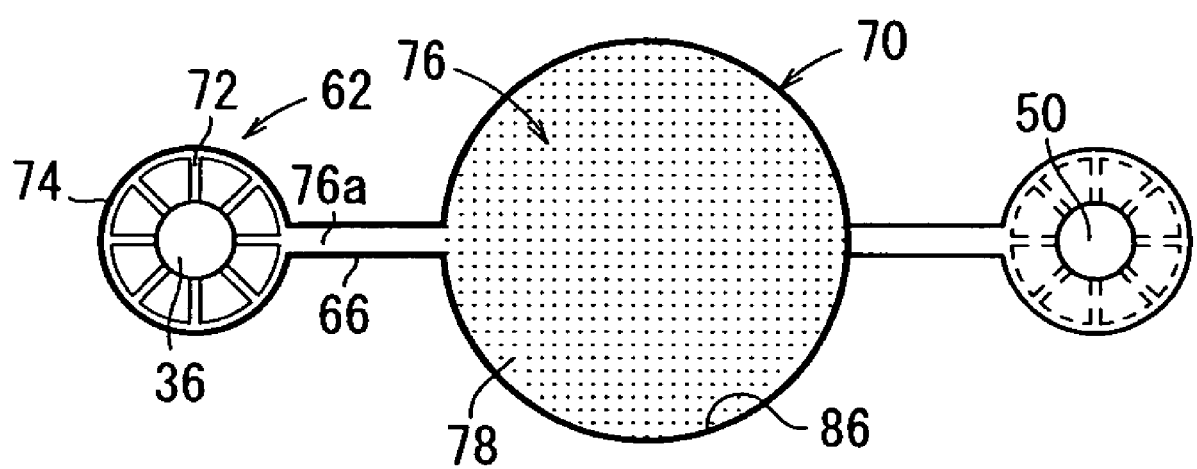
FIG. 5 is a view, with partial omission, showing one surface of a third plate of the fuel cell.

As shown in FIGS. 2 and 5, the third plate 34 has a plurality of slits 72 radially formed in the third small diameter end portion 62, on a surface facing the first plate 30. The slits 72 are connected to the fuel gas supply passage 36. Further, the slits 72 are connected to a recess 74 formed in an outer circumferential region of the third small diameter end portion 62. The recess 74 prevents the entry of brazing material into the slits 72, and into an area inside the recess 74. A fuel gas channel 76 is formed in the bridge 66 and in the surface of the third circular disk 70. The fuel gas flows from the fuel gas supply passage 36 to the fuel gas channel 76 through the slits 72. A plurality of third protrusions 78 are formed on the third circular disk 70, and the third protrusions 78 are part of the fuel gas channel 76.

Figure 6:
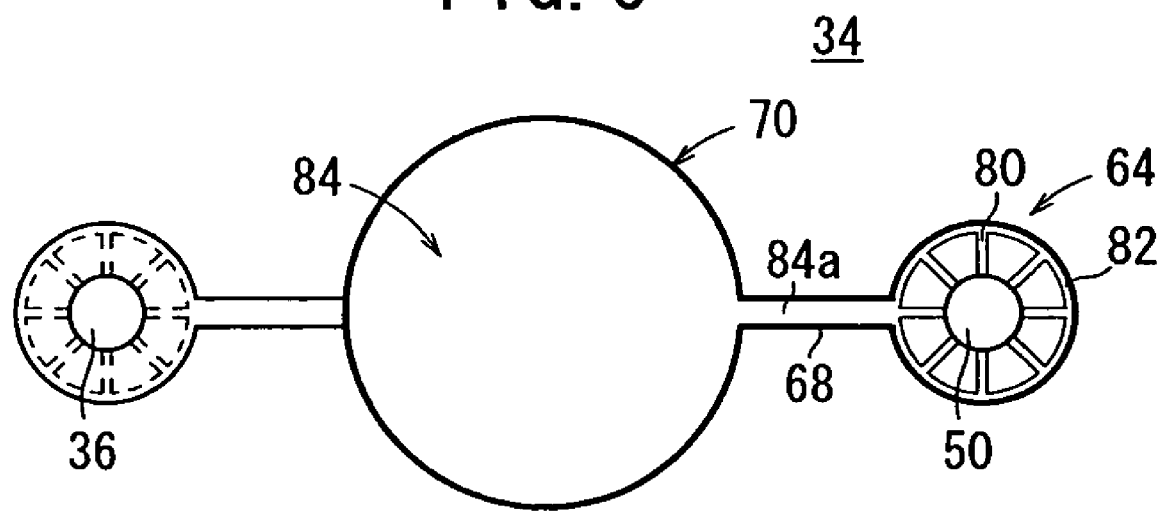
FIG. 6 is a view, with partial omission, showing the other surface of the third plate.

As shown in FIG. 6, the third plate 34 has a plurality of slits 80 radially formed in the fourth small diameter end portion 64, on a surface which contacts the second plate 32. The slits 80 are connected to the oxygen-containing gas supply passage 50. Further, the slits 80 are connected to a recess 82. The recess 82 prevents the entry of brazing material into slits 80, and into an area inside the recess 82. An oxygen-containing gas channel 84 is formed in the third circular disk 70. The oxygen-containing gas flows through the slits 80 into the third circular disk 70. The oxygen-containing gas channel 84 is closed by the outer circumferential region of the third circular disk 70.

The first plate 30 is joined to one surface of the third plate 34 by brazing to form the fuel gas channel 76 connected to the fuel gas supply passage 36 between the first and third plates 30, 34. The bridge 40 of the first plate 30 and the bridge 66 of the third plate 34 are joined together to form a fuel gas channel member, and a fuel gas distribution passage 76a as part of the fuel gas channel 76 is formed in the fuel gas channel member (see FIG. 7).

The fuel gas channel 76 is provided between the first and third circular disks 42, 70, over the electrode surface of the anode 24. The first circular disk 42 is provided between the fuel gas channel 76 and the anode 24, and the fuel gas is supplied to the fuel gas channel 76. That is, a fuel gas pressure chamber 86 is formed such that the first circular disk 42 tightly contacts the anode 24 under pressure (see FIGS. 7 and 8).

Figure 8:
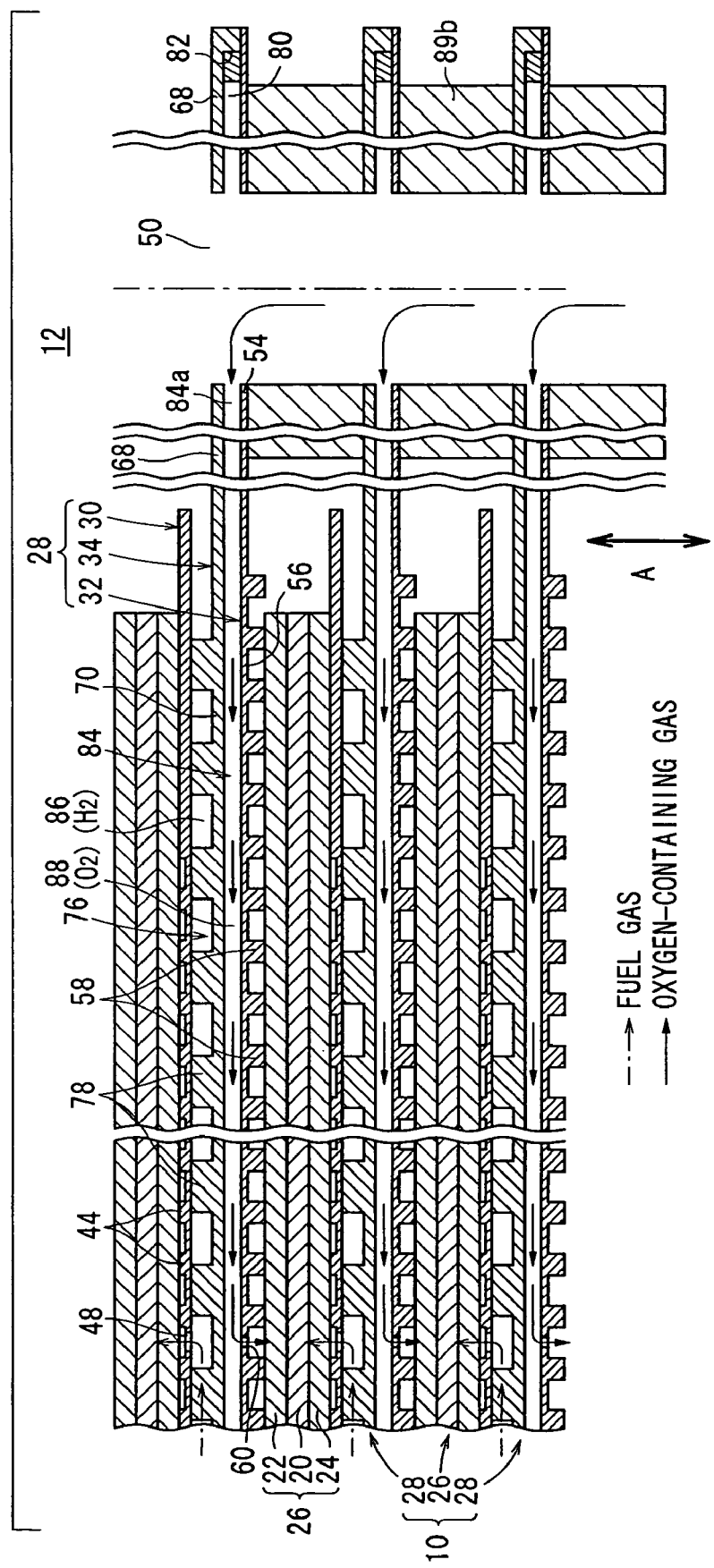
FIG. 8 is an enlarged cross sectional view showing a region near an oxygen-containing gas supply passage of the fuel cell.

The second plate 32 is joined to the third plate 34 by brazing to form the oxygen-containing gas channel 84 connected to the oxygen-containing gas supply passage 50 between the second and third plates 32, 34 (see FIG. 8). The bridge 54 of the second plate 32 and the bridge 68 of the third plate 34 are joined together to form an oxygen-containing gas channel member, and an oxygen-containing gas distribution passage 84a as part of the oxygen-containing gas channel 84 is formed in the oxygen-containing gas channel member.

The oxygen-containing gas channel 84 is provided between the second and third circular disks 56, 70, over the electrode surface of the cathode 22. The second circular disk 56 is provided between the oxygen-containing gas channel 84 and the cathode 22, and the oxygen-containing gas is supplied to the oxygen-containing gas channel 84. That is, an oxygen-containing gas pressure chamber 88 is formed such that the second circular disk 56 tightly contacts the cathode 22 under pressure (see FIGS. 7 and 8.).

Insulating seals 89a for sealing the fuel gas supply passage 36 and insulating seals 89b for sealing the oxygen-containing gas supply passage 50 are provided between the separators 28. For example, the insulating seals 89a, 89b are made of mica material, or ceramic material.

As shown in FIG. 1, the fuel cell stack 12 includes end plates 90a, 90b provided at opposite ends of the fuel cells 10 in the stacking direction. The end plate 90a or the end plate 90b are electrically insulated from tightening bolts 98. A first pipe 92 and a second pipe 94 extend through the end plate 90a. The first pipe 92 is connected to the fuel gas supply passage 36, and the second pipe 94 is connected to the oxygen-containing gas supply passage 50. The end plates 90a, 90b have bolt holes 96 at positions above and under the fuel gas supply passage 36, and at positions above and under the oxygen-containing gas supply passage 50. Tightening bolts 98 are inserted into the respective bolt holes 96, and tip ends of the respective tightening bolts 98 are screwed into nuts 99 for tightening the fuel cell stack 12.

Next, operation of the fuel cell stack 12 will be described below.

As shown in FIG. 2, in assembling the fuel cell 10, firstly, the first plate 30 of the separator 28 is joined to one surface of the third plate 34, and the second plate 32 is joined to the other surface of the third plate 34. Thus, the third plate 34 divides a space in the separator 28 to form the fuel gas channel 76 connected to the fuel gas supply passage 36 and the oxygen-containing gas channel 84 connected to the oxygen-containing gas supply passage 50 separately (see FIG. 3).

Figure 9:
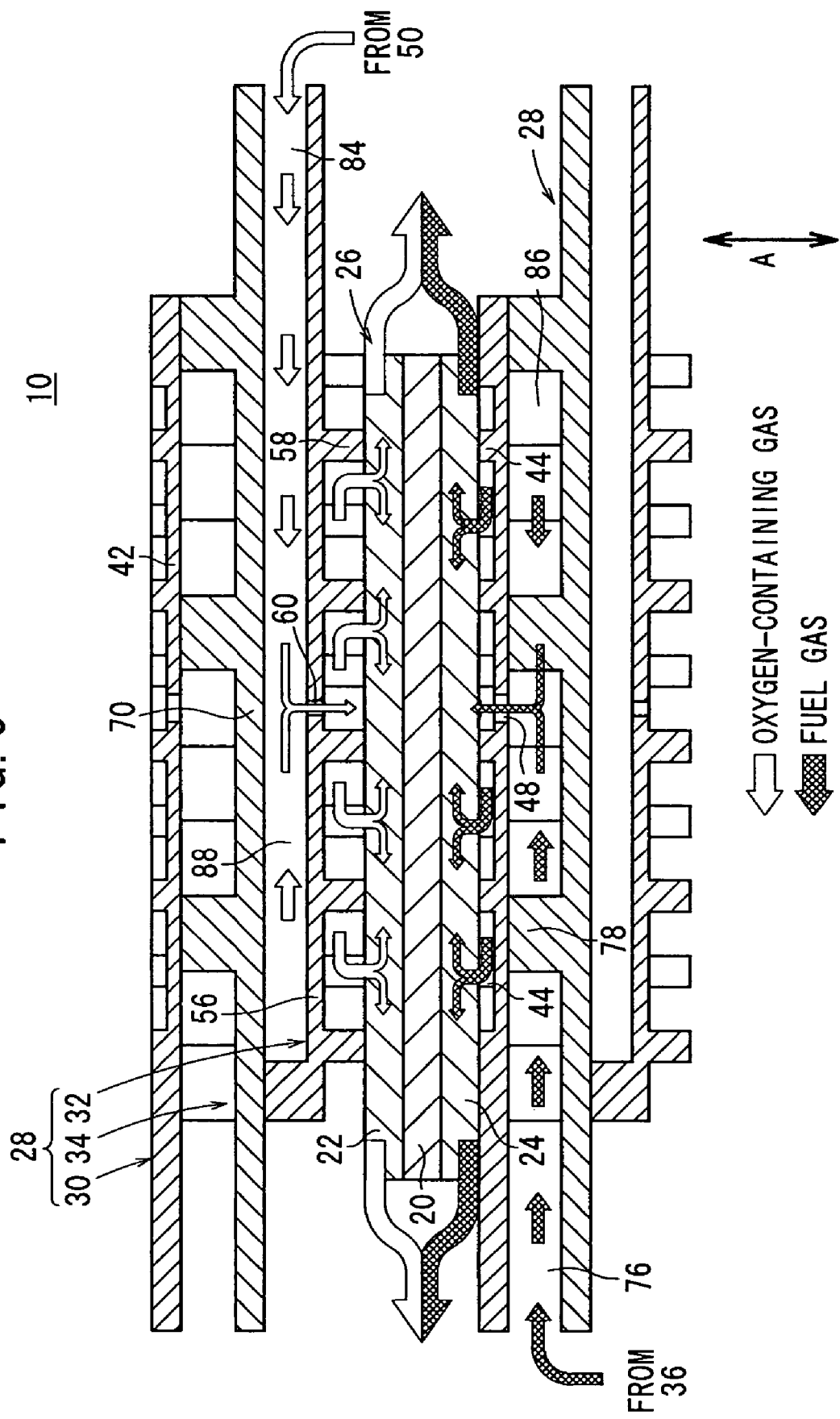
FIG. 9 is a cross sectional view schematically showing operation of the fuel cell.

Further, the fuel gas pressure chamber 86 is formed between the first and third circular disks 42, 70, and the oxygen-containing gas pressure chamber 88 is formed between the second and third circular disks 56, 70 (see FIG. 9).

Then, the separators 28 and the electrolyte electrode assemblies 26 are stacked alternately, and the end plates 90*a*, 90*b* are provided at the opposite ends in the stacking direction. The end plate 90*a* or the end plate 90*b* is electrically insulated from the tightening bolts 98. The tightening bolts 98 are inserted into the respective bolt holes 96 of the end plates 90*a*, 90*b*, and the tip ends of the tightening bolts 98 are screwed into the nuts 99 to form the fuel cell stack 12 (see FIG. 1).

A fuel gas (e.g., hydrogen-containing gas) is supplied to the first pipe 92 connected to the end plate 90*a*, and the fuel gas flows from the first pipe 92 to the fuel gas supply passage 36. An oxygen-containing gas (hereinafter also referred to as the air) is supplied to the second pipe 94 connected to the end plate 90*a*, and the oxygen-containing gas flows from the second pipe 94 to the oxygen-containing gas supply passage 50.

Figure 7:
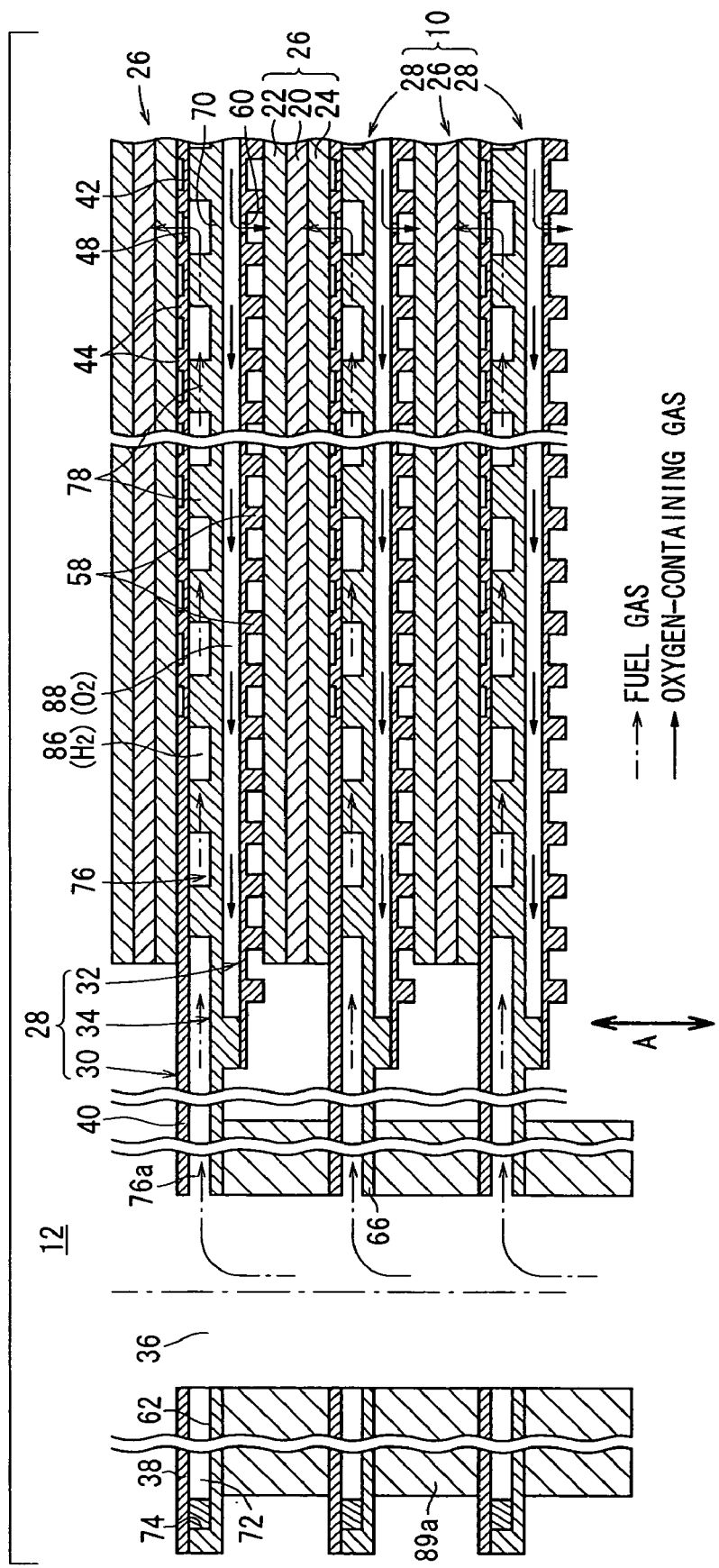
FIG. 7 is an enlarged cross sectional view showing a region near a fuel gas supply passage of the fuel cell.

As shown in FIG. 7, after the fuel gas flows into the fuel gas supply passage 36, the fuel gas flows in the stacking direction indicated by the arrow A, and is supplied to the fuel gas channel 76 in the separator 28 in each of the fuel cells 10. The fuel gas flows along the fuel gas channel 76, and flows into the fuel gas pressure chamber 86 between the first and third circular disks 42, 70. The fuel gas flows between the third protrusions 78, and flows into the fuel gas inlet 48 at the central position of the first circular disk 42.

The fuel gas inlet 48 is provided at a position corresponding to the central position of the anode 24 in each of the electrolyte electrode assemblies 26. Therefore, as shown in FIG. 9, the fuel gas from the fuel gas inlet 48 is supplied to the anode 24,. and flows from the central region of the anode 24 toward the outer circumferential region of the anode 24.

As shown in FIG. 8, after the oxygen-containing gas flows into the oxygen-containing gas supply passage 50, the oxygen-containing gas flows through the oxygen-containing gas channel 84 in the separator 28, and is supplied to the oxygen-containing gas pressure chamber 88 between the second and third circular disks 56, 70. The oxygen-containing gas flows into the oxygen-containing gas inlet 60 at the central position of the second circular disk 56.

The oxygen-containing gas inlet 60 is provided at a position corresponding to the central position of the cathode 22 in each of the electrolyte electrode assemblies 26. Therefore, as shown in FIG. 9, the oxygen-containing gas from the oxygen-containing gas inlet 60 is supplied to the cathode 22, and flows from the central region of the cathode 22 to the outer circumferential region of the cathode 22.

Thus, in each of the electrolyte electrode assemblies 26, the fuel gas is supplied from the central region of the anode 24 to the outer circumferential region of the anode 24, and the oxygen-containing gas is supplied from the central region of the cathode 22 to the outer circumferential region of the cathode 22 for generating electricity. After the fuel gas and the oxygen-containing gas are consumed in the power generation, the fuel gas and the oxygen-containing gas are discharged as an exhaust gas from the outer circumferential regions of the first through third circular disks 42, 56, and 70.

According to the first embodiment, in the separator 28, the fuel gas pressure chamber 86 is formed between the first and third circular disks 42, 70, over the electrode surface of the anode 24 such that the first circular disk 42 is interposed between the fuel gas pressure chamber 86 and the anode 24, and the oxygen-containing gas pressure chamber 88 is formed between the second and third circular disks 56, 70, over the electrode surface of the cathode 22 such that the second circular disk 56 is interposed between the oxygen-containing gas pressure chamber 88 and the cathode 22.

As shown in FIG. 9, the fuel gas supplied to the fuel gas channel 76 flows into the fuel gas pressure chamber 86. When the fuel gas flows through the small opening of the fuel gas inlet 48, the internal pressure in the fuel gas pressure chamber 86 is increased, and the fuel gas pressure chamber 86 is expanded such that the first circular disk 42 made of a thin plate tightly contacts the anode 24 under pressure. Likewise, the oxygen-containing gas supplied to the oxygen-containing gas channel 84 flows into the oxygen-containing gas pressure chamber 88. When the oxygen-containing gas flows through the small opening of the oxygen-containing gas inlet 60, the internal pressure in the oxygen-containing gas pressure chamber 88 is increased, and the oxygen-containing gas pressure chamber 88 is expanded such that the second circular disk 56 made of a thin plate tightly contacts the cathode 22 under pressure.

Therefore, dimensional variations of the separator 28 and the electrolyte electrode assembly 26 are absorbed, and thus, with the simple and compact structure, it is possible to maintain the uniform surface pressure applied between the electrolyte electrode assembly 26 and the first and second circular disks 42, 56 as the current collectors. Further, the first and second circular disks 42, 56 tightly contact the entire surfaces of the anode 24 and the cathode 22 with the uniform surface pressure. The contact resistances of the current collectors are reduced. Thus, improvement in the power generation efficiency is achieved easily.

Further, since the excessive surface pressure is not locally applied to the electrolyte electrode assembly 26, the damage of the electrolyte electrode assembly 26 is prevented desirably. Further, the shapes of the fuel gas channel 76 and the oxygen-containing gas channel 84 formed between the electrolyte electrode assembly 26 and the current collectors are maintained uniformly. The uniform flows of the fuel gas channel 76 and the oxygen-containing gas channel 84 are achieved, and the power generation efficiency is improved.

In the first embodiment, the third plate 34 is interposed between the first and second plates 30, 32. The third plate 34 divides the space between the first and second plates 30, 32 to form the fuel gas channel 76 and the oxygen-containing gas channel 84. Thus, the fuel gas pressure chamber 86 and the oxygen-containing gas pressure chamber 88 are reliably separated. When the fuel gas is supplied to the fuel gas pressure chamber 86, the internal pressure in the fuel gas pressure chamber 86 is increased, and when the oxygen-containing gas is supplied to the oxygen-containing gas pressure chamber 88, the internal pressure in the oxygen-containing gas pressure chamber 88 is increased.

Further, as shown in FIG. 9, the fuel gas flows from the fuel gas inlet 48 toward the central region of the anode 24, and the oxygen-containing gas flows from the oxygen-containing gas inlet 60 toward the central region of the cathode 22. The fuel gas and the oxygen-containing gas flow from the central regions to the outer circumferential regions of the anode 24 and the cathode 22, respectively. Thus, the gas utilization ratios are improved effectively.

Further, the third plate 34 has the third protrusions 78 protruding toward the first plate 30. Though the pressure in the oxygen-containing gas channel 84 is higher than the pressure in the fuel gas channel 76, distortion or deformation does not occur in the third plate 34, and thus, the shape of the fuel gas channel 76 is maintained, and the fuel gas is supplied stably.

Figure 10:
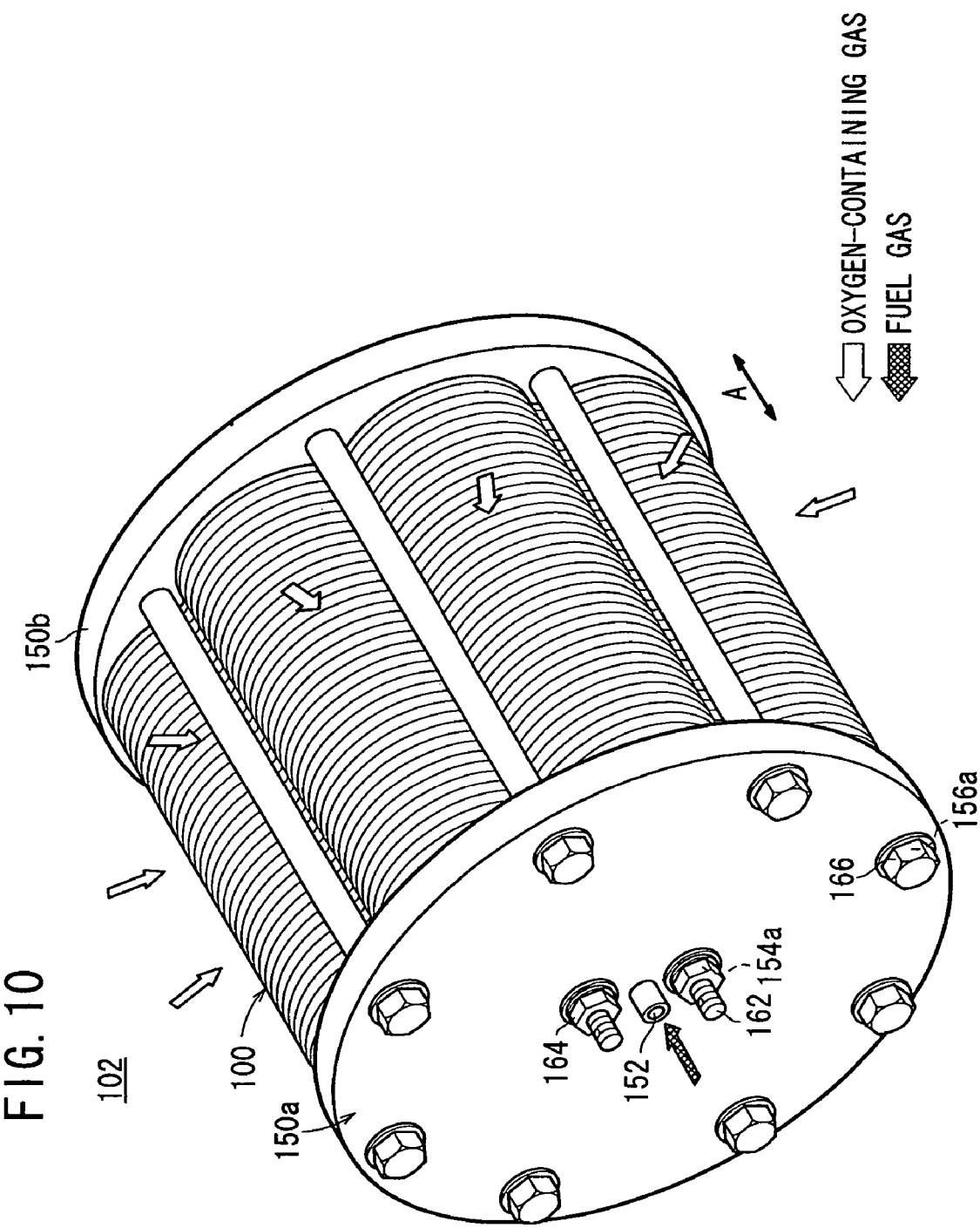
FIG. 10 is a perspective view schematically showing a fuel cell stack formed by stacking a plurality of fuel cells according to a second embodiment of the present invention.
Figure 11:
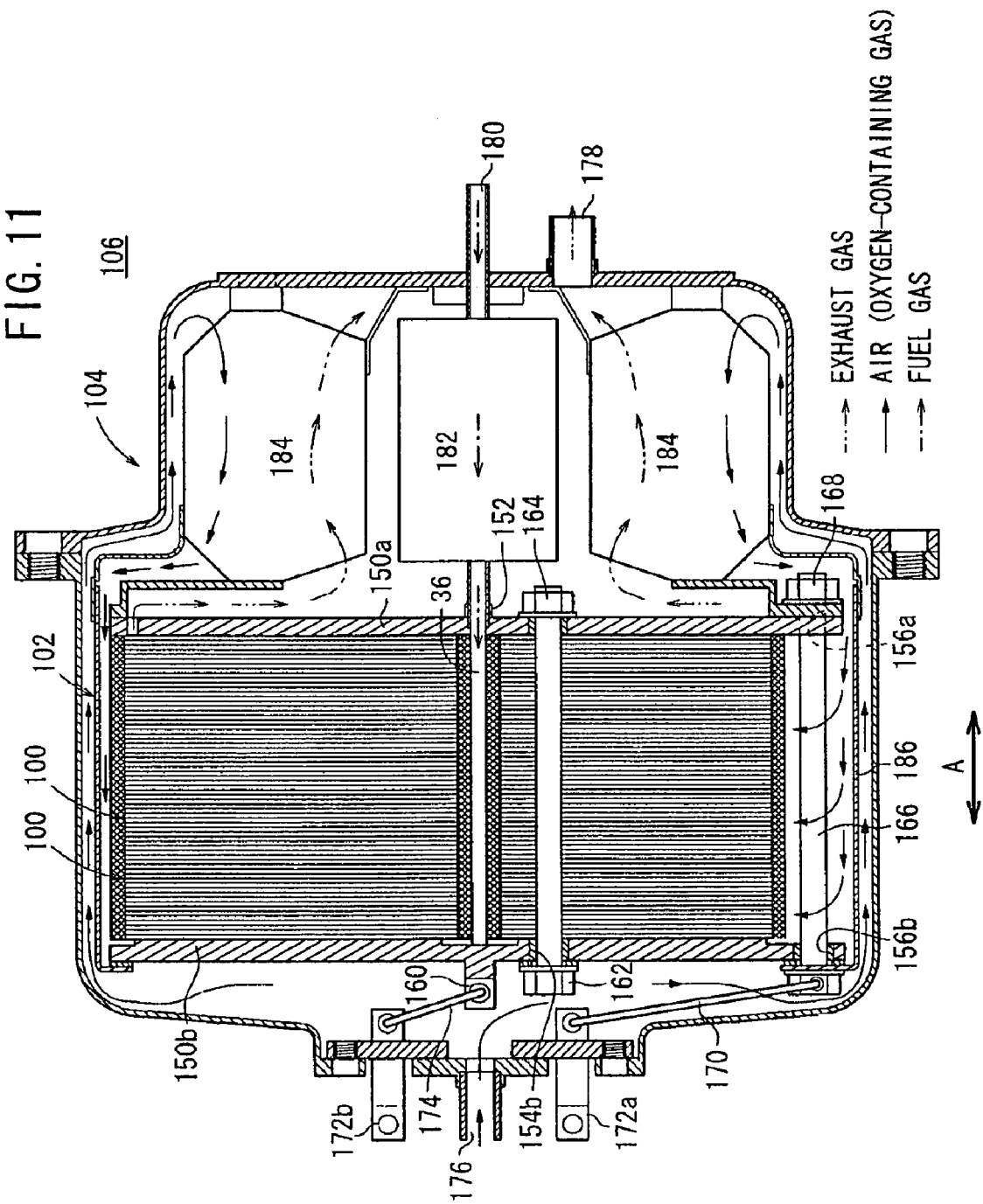
FIG. 11 is a cross sectional view showing part of a fuel cell system in which the fuel cell stack is disposed in a casing.

FIG. 10 is a perspective view schematically showing a fuel cell stack 102 formed by stacking a plurality of fuel cells 100 according to a second embodiment of the present invention in a direction indicated by an arrow A. FIG. 11 is a cross sectional view showing part of a fuel cell system 106 in which the fuel cell stack 102 is disposed in a casing 104.

The constituent elements that are identical to those of the fuel cell 10 according to the first embodiment are labeled with the same reference numeral, and description thereof will be omitted. In a third embodiment as described later, the constituent elements that are identical to those of the fuel cell 10 according to the first embodiment are labeled with the same reference numeral, and description thereof will be omitted.

Figure 12:
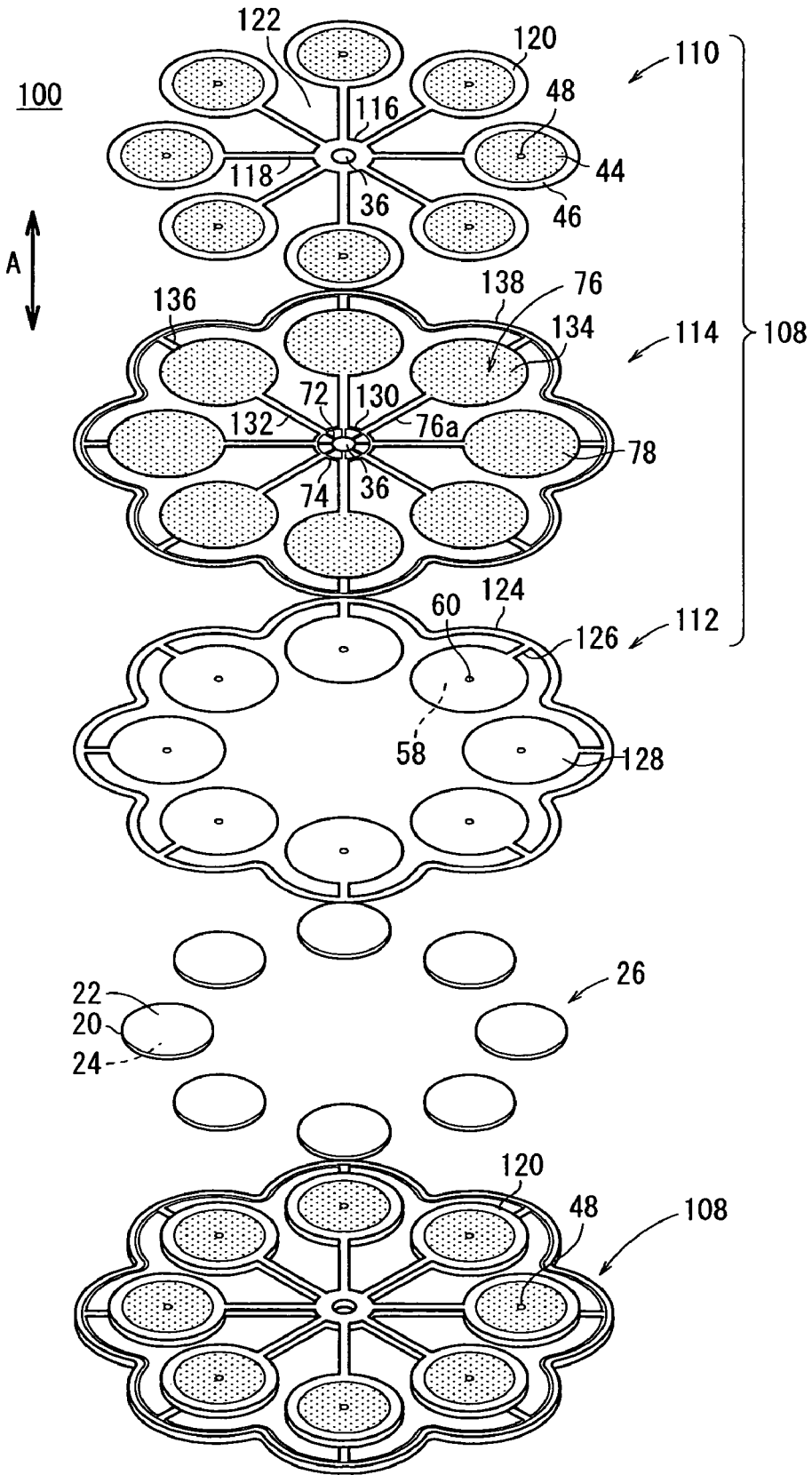
FIG. 12 is an exploded perspective view showing separators of the fuel cell.
Figure 13:
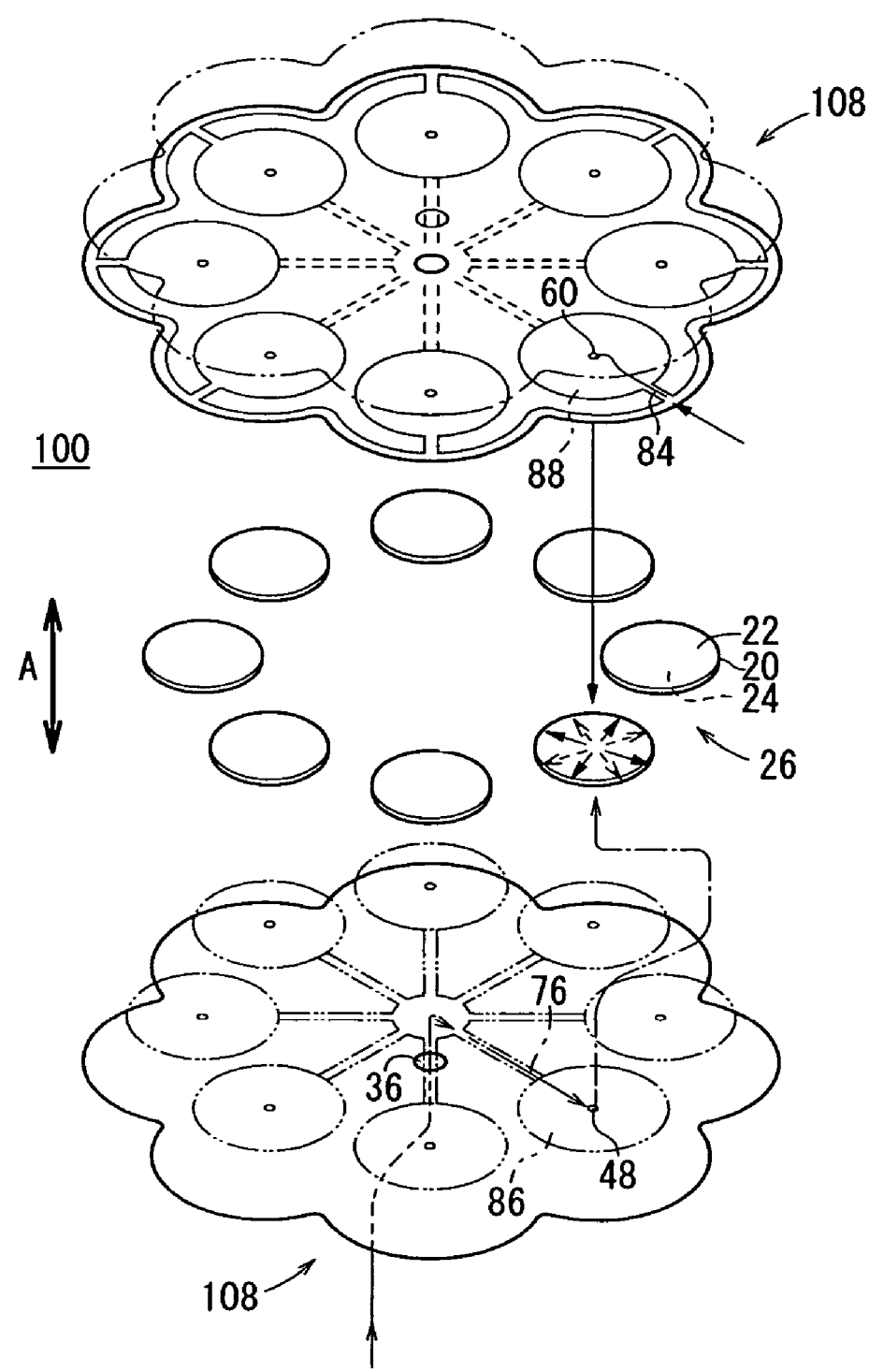
FIG. 13 is a partial exploded perspective view showing gas flows of the fuel cell.

As shown in FIGS. 12 and 13, a plurality of, e.g., eight electrolyte electrode assemblies 26 are interposed between a pair of separators 108 to form the fuel cell 100. The electrolyte electrode assemblies 26 are concentric with a fuel gas supply passage 36 extending through the center of the separators 108.

Each of the separators 108 includes first and second plates 110, 112 which are stacked together, and a third plate 114 interposed between the first and second plates 110, 112. The first through third plates 110, 112, and 114 are metal plates of, e.g., stainless alloy.

The first plate 110 has a first small diameter end portion 116. The fuel gas supply passage 36 extends through the center of the first small diameter end portion 116. The first small diameter end portion 116 is integral with first circular disks 120 each having a relatively large diameter through a plurality of bridges 118. The bridges 118 are extending radially outwardly from the first small diameter end portion 116 at equal angles (intervals). An exhaust gas channel 122 is formed in the area around, and internal from the first circular disks 120.

Each of the first circular disks 120 has a plurality of first protrusions 44 and a substantially ring shaped protrusion 46 on a surface which contacts the anode 24 of the electrolyte electrode assembly 26. A fuel gas inlet 48 is provided at the center of the first circular disk 120.

The second plate 112 has a curved outer section 124. Respective circular arc portions of the curved outer section 124 are integral with second circular disks 128 each having a relatively large diameter through bridges 126 extending internally from the circular arc portions. As with the first circular disks 120 of the first plate 110, the number of the second circular disks 128 is eight, and the second circular disks 128 are provided at equal angles (intervals). Each of the second circular disks 128 has a plurality of second protrusions 58 on a surface which contacts the cathode 22 of the electrolyte electrode assembly 26. An oxygen-containing gas inlet 60 is provided at the center in each of the second circular disks 128.

The third plate 114 has a second small diameter end portion 130. The fuel gas supply passage 36 extends through the center of the second small diameter end portion 130. Eight bridges 132 extend radially from the second small diameter end portion 130, and tip ends of the bridges 132 are integral with third circular disks 134 each having a relative large diameter. Bridges 136 are provided on extension lines of (in alignment with) the bridges 132. All the bridges 136 are integral with a curved outer section 138 of the third plate 114.

A plurality of third protrusions 78 are formed on the entire surface of the third circular disk 134 facing the first plate 110. Slits 72 and a recess 74 are formed on the second small diameter end portion 130. Further, a fuel gas distribution passage 76a as part of a fuel gas channel 76 is formed in each of the bridges 132.

Figure 14:
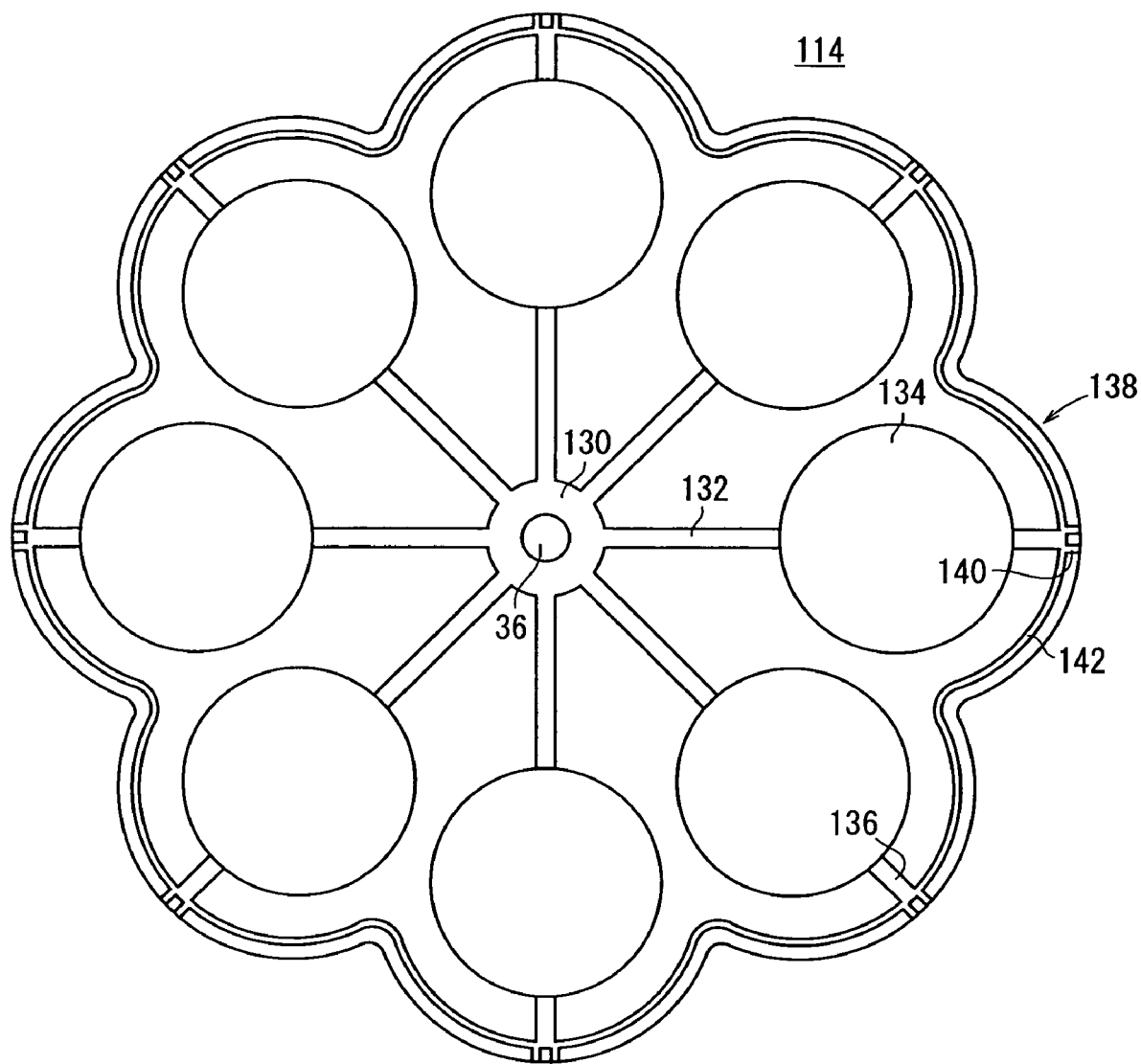
FIG. 14 is a view showing one surface of a third plate of the separator.

As shown in FIG. 14, the curved outer section 138 of the third plate 114 has a plurality of slits 140 as air intake passages at positions corresponding to the respective third circular disks 134, on a surface facing the second plate 112. Further, a recess 142 for preventing the flow of brazing material is formed along the profile of the curved outer section 138.

Figure 15:
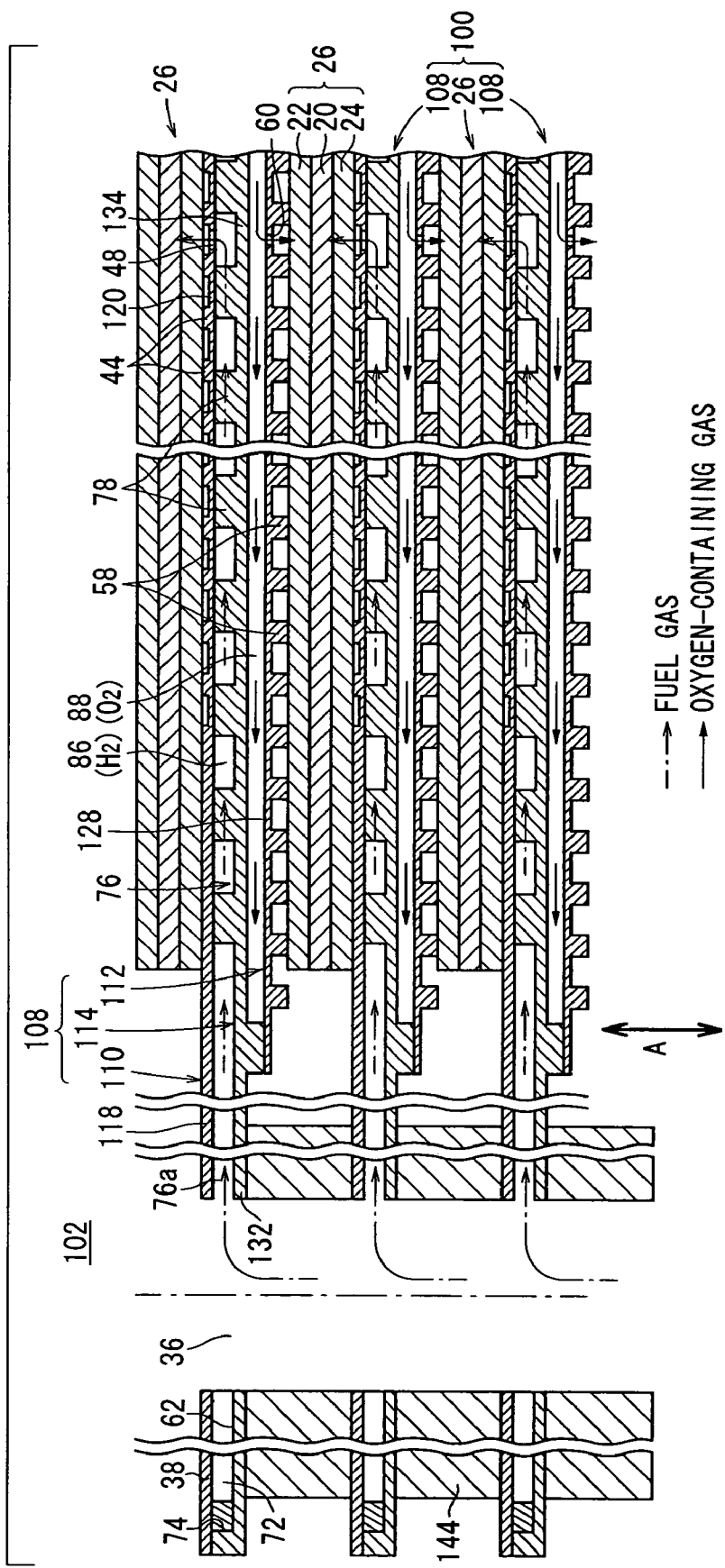
FIG. 15 is an enlarged cross sectional view showing a central region of the fuel cell.

As shown in FIG. 15, when the first plate 110 is jointed to the third plate 114 by brazing, the respective bridges 118, 132 are joined together to form fuel gas channel members. Fuel gas distribution passages 76a as part of the fuel gas channel 76 are formed in the fuel gas channel members. The fuel gas channel 76 forms a fuel gas pressure chamber 86 between the first and third circular disks 120, 134.

Figure 16:
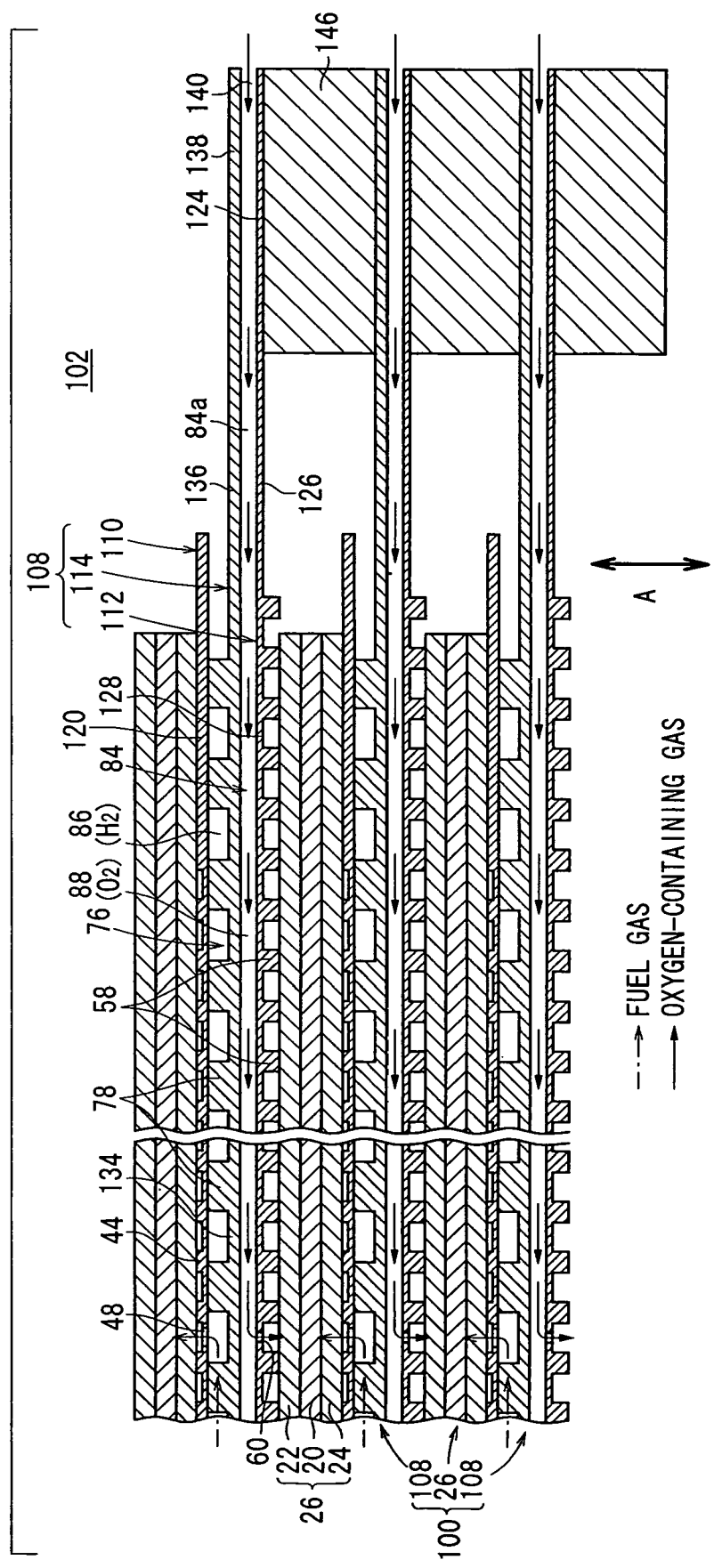
FIG. 16 is an enlarged cross sectional view showing an outer circumferential region of the fuel cell.

As shown in FIG. 16, when the second plate 112 is jointed to the third plate 114 by brazing, the respective bridges 126, 136 are joined together to form oxygen-containing gas channel members. Oxygen-containing gas distribution passages 84a as part of oxygen-containing gas channel 84 are formed in the oxygen-containing gas channel members. The oxygen-containing gas channel 84 forms an oxygen-containing gas pressure chamber 88 between the second and third circular disks 128, 134.

As shown in FIG. 15, insulating seals 144 for sealing the fuel gas supply passage 36 are provided between the separators 108. Further, as shown in FIG. 16, insulating seals 146 are provided between the curved outer sections 124, 138. For example, the insulating seals 144, 146 are made of mica material, or ceramic material.

As shown in FIGS. 10 and 11, the fuel cell stack 102 includes circular disk shaped end plates 150a, 150b provided at opposite ends of the fuel cells 100 in the stacking direction. The end plate 150a is insulated, and a fuel gas supply port 152 is formed at the center of the end plate 150a. The fuel gas supply port 152 is connected to the fuel gas supply passage 36 extending through each of the fuel cells 100.

The end plate 150a has two bolt insertion holes 154a. The fuel gas supply port 152 is positioned between the bolt insertion holes 154a. The bolt insertion holes 154a are provided in the exhaust gas channel 122 of the fuel cell stack 102. Further, the end plate 150a has eight bolt insertion holes 156a at positions between the respective electrolyte electrode assemblies 26.

The end plate 150b is made of electrically conductive material. As shown in FIG. 11, the end plate 150b has a connection terminal 160. The connection terminal 160 axially extends from the central region of the end plate 150b. Further, the end plate 150b has two bolt insertion holes 154b. The connection terminal 160 is positioned between the bolt insertion holes 154b. The bolt insertion holes 154a are in alignment with the bolt insertion holes 154b. Two bolts 162 are inserted through the bolt insertion holes 154a, 154b, and tip ends of the bolts 162 are screwed into nuts 164. The bolts 162 are electrically insulated from the end plate 150b.

Further, the end plate 150b has eight bolt insertion holes 156b in alignment with the bolt insertion holes 156a of the end plate 150a. Bolts 166 are inserted into the respective bolt insertion holes 156a, 156b, and tip ends of the bolts 166 are screwed into nuts 168. Heads of the bolts 166 are connected electrically to an output terminal 172a through conductive wires 170, and the connection terminal 160 is electrically connected to an output terminal 172b through a conductive wire 174.

The output terminals 172a, 172b are arranged in parallel, and are adjacent to each other. The output terminals 172a, 172b are fixed to the casing 104. The casing 104 has an air supply port 176 positioned between the output terminals 172a, 172b. Further, an exhaust gas port 178 is provided on the other end of the casing 104. A fuel gas supply port 180 is provided adjacent to the exhaust gas port 178. The fuel gas supply port 180 is connected to the fuel gas supply passage 36 through a reformer 182 as necessary. A heat exchanger 184 is provided around the reformer 182. A dual structure section 186 is provided in the casing 104, and the fuel cell stack 102 is disposed in the dual structure section 186.

Operation of the fuel cell stack 102 will be described below.

As shown in FIG. 12, in assembling the fuel cell 100, firstly, the first plate 110 and the second plate 112 are joined to both surfaces of the third plate 114 of the separator 108, e.g., by brazing. Further, the ring shaped insulating seal 144 is provided on the first plate 110 or the third plate 114 around the fuel gas supply passage 36 by brazing (see FIG. 15). Further, the curved insulating seal 146 is provided on the curved outer section 124 of the second plate 112 or the curved outer section 138 of the third plate 114 (see FIG. 16).

In this manner, the separator 108 is fabricated. The third plate 114 divides a space between the first and second plates 110, 112 to form the fuel gas channel 76 and the oxygen-containing gas channel 84 (see FIG. 17). Further, the fuel gas channel 76 is connected to the fuel gas supply passage 36 through the fuel gas distribution passage 76a, and the oxygen-containing gas channel 84 is open to the outside through the slits 140. The oxygen-containing gas is supplied through the slits 140 to the oxygen-containing gas channel 84.

Then, the eight electrolyte electrode assembles 26 are sandwiched between the separators 108. As shown in FIG. 12, the electrolyte electrode assemblies 26 are placed between the separators 108, i.e., between the first circular disks 120 of one separator 108 and the second circular disks 128 of the other separator 108. The fuel gas inlet 48 is positioned at the center in each of the anodes 24, and the oxygen-containing gas inlet 60 is positioned at the center in each of the cathodes 22.

The fuel cells 100 as assembled above are stacked in the direction indicated by the arrow A, and tightened together between the end plates 150a, 150b to form the fuel cell stack 102 (see FIG. 10). As shown in FIG. 11, the fuel cell stack 102 is mounted in the casing 104.

Then, the fuel gas is supplied into the fuel gas supply port 180 of the casing 104, and the air is supplied into the air supply port 176 of the casing 104.

The fuel gas flows through the reformer 182 as necessary, and supplied into the fuel gas supply passage 36 of the fuel cell stack 102. The fuel gas flows in the stacking direction indicated by the arrow A, and flows through the fuel gas distribution passages 76a in the separator 108 of each fuel cell 100 (see FIG. 15).

Figure 17:
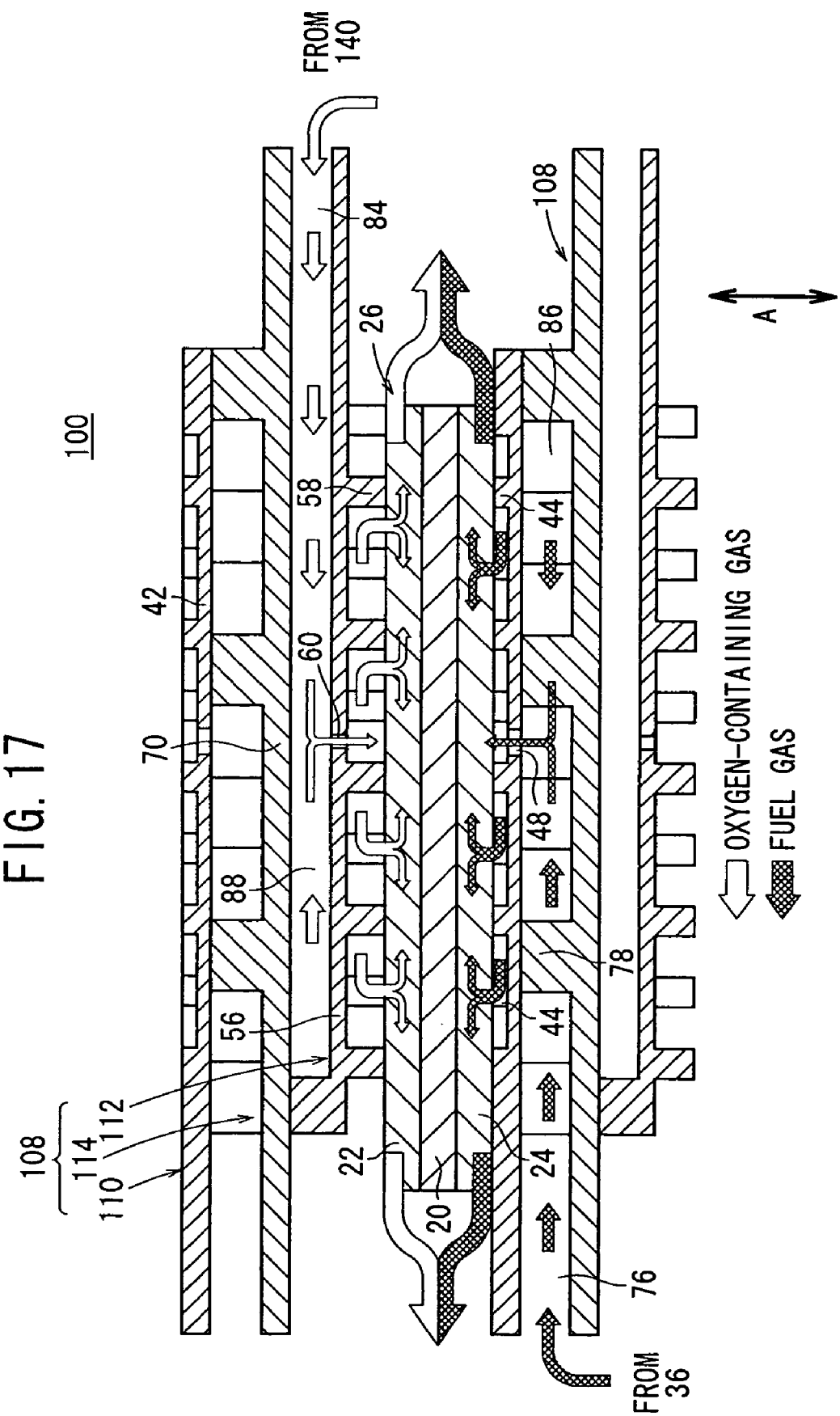
FIG. 17 is a cross sectional view schematically showing operation of the fuel cell.

The fuel gas flows along the fuel gas distribution passage 76a into the fuel gas pressure chamber 86. When the fuel gas flows through the small opening of the fuel gas inlet 48, the internal pressure in the fuel gas pressure chamber 86 is increased. As shown in FIG. 17, the fuel gas from the fuel gas inlet 48 flows toward the central region of the anode 24 of the electrolyte electrode assembly 26. The fuel gas flows from the central region of the anode 24 to the outer circumferential region of the anode 24.

The oxygen-containing gas is supplied from the outer circumferential region in each of the fuel cell 100. The oxygen-containing gas flows through the slits 140 formed in the outer circumferential region in each of the separator 108, and is supplied to the oxygen-containing gas channel 84 (see FIG. 16). The oxygen-containing gas supplied to the oxygen-containing gas channel 84 flows into the oxygen-containing gas pressure chamber 88. When the oxygen-containing gas flows into the small opening of the oxygen-containing gas inlet 60, the internal pressure of the oxygen-containing gas in the oxygen-containing gas pressure chamber 88 is increased. The oxygen-containing gas from the oxygen-containing gas inlet 60 flows toward the central region of the cathode 22. The oxygen-containing gas flows from the central region of the cathode 22 to the outer circumferential region of the cathode 22 (see FIG. 17).

Therefore, in the electrolyte electrode assembly 26, the fuel gas is supplied from the central region to the outer circumferential region of the anode 24, and the oxygen-containing gas is supplied from the central region to the outer circumferential region of the cathode 22 (see FIG. 17). At this time, oxygen ions flow toward the anode 24 through the electrolyte 20 for generating electricity by the chemical reactions.

The fuel cells 100 are connected in series in the stacking direction indicated by the arrow A. As shown in FIG. 11, one of the poles is connected from the connection terminal 160 of the electrically conductive end plate 150b to the output terminal 172b through the conductive wire 174. The other pole is connected from the bolts 166 to the output terminal 172a through the conductive wires 170. Thus, the electric energy can be collected from the output terminals 172a, 172b.

After the fuel gas and the oxygen-containing gas are consumed in the reactions, the fuel gas and the oxygen-containing gas flow toward the outer circumferential regions in each of the electrolyte electrode assembly 26, and are mixed together. The mixed gas flows as an exhaust gas into the exhaust gas channel 122 extending through the separators 108, and flows in the stacking direction. Then, the exhaust gas is discharged to the outside of the casing 104 from the exhaust port 178.

In the second embodiment, the first and third plates 110, 114 are joined together to form the fuel gas channel 76 connected to the fuel gas supply passage 36 between the first and third plates 110, 114. The fuel gas channel 76 forms the fuel gas pressure chamber 86 between the first and third circular disks 120, 134 which are joined together.

Therefore, the fuel gas supplied to the fuel gas channel 76 flows into the fuel gas pressure chamber 86. When the fuel gas flows through the small opening of the fuel gas inlet 48, the internal pressure in the fuel gas pressure chamber 86 is increased, and the fuel gas pressure chamber 86 is expanded to press the first circular disk 120 of the first plate 110 toward the anode 24 of the electrolyte electrode assembly 26 (see FIG. 17).

Likewise, the second and third plates 112, 114 are joined together to form the oxygen-containing gas channel 84 between the second and third plates 112, 114. Further, the oxygen-containing gas pressure chamber 88 is formed between the second and third circular disks 128, 134. Therefore, the oxygen-containing gas supplied to the oxygen-containing gas channel 84 flows into the oxygen-containing gas pressure chamber 88. When the oxygen-containing gas flows through the small opening of the oxygen-containing gas inlet 60, the internal pressure in the oxygen-containing gas pressure chamber 88 is increased, and the oxygen-containing gas pressure chamber 88 is expanded to press the second circular disk 128 of the second plate 112 toward the cathode 22.

Therefore, even in the presence of the dimensional variations of the separator 108 and the electrolyte electrode assembly 26, the entire surface of the first circular disk 120 tightly contacts the electrode surface of the anode 24, and the entire surface of the second circular disk 128 tightly contacts the electrode surface of the cathode 22. Thus, with the simple and compact structure, it is possible to maintain the uniform pressure applied between the electrolyte electrode assembly 26 and the first and second circular disk 120, 128.

Further, the first and second circular disks 120, 128 tightly contact the entire electrode surfaces of the electrolyte electrode assembly 26 with the uniform surface pressure. The contact resistances of the current collector are reduced. Thus, improvement in the power generation efficiency is achieved easily.

Further, the third plate 114 divide the space between the first and second plates 110, 112 for separating the fuel gas and the oxygen-containing gas without any leakage. Thus, improvement in the power generation efficiency is achieved easily. Further, the fuel gas and the oxygen-containing gas flow into the central regions of the anode 24 and the cathode 22, respectively. Therefore, the fuel gas and the oxygen-containing gas are utilized effectively, and the gas utilization ratios are improved.

Further, the exhaust gas channel 122 is formed around the respective electrolyte electrode assemblies 26 in the separator 108. Thus, the heat of the exhaust gas discharged into the exhaust gas channel 122 is utilized to warm the electrolyte electrode assemblies 26. Thus, improvement in the thermal efficiency is achieved easily.

Further, a plurality of the first and second protrusions 44, 58 are provided on the first and second circular disks 120, 128 as the current collectors. Therefore, improvement in the current collecting efficiency is achieved. Further, the third protrusion 78 protruding toward the first plate 110 is provided on the third plate 114. Therefore, though the pressure in the oxygen-containing gas channel 84 is higher than the pressure in the fuel gas channel 76, distortion or deformation does not occur in the third plate 114, and thus, the shape of the fuel gas channel 76 is maintained, and the fuel gas is supplied stably. Further, the internal pressures in the respective chambers 86, 88 are increased, and the pressure chambers 86, 88 are expanded to generate pressure load to press the electrolyte electrode assemblies 26. Therefore, the required surface pressure is generated for tightening the electrolyte electrode assemblies 26 without any external tightening means.

Figure 18:
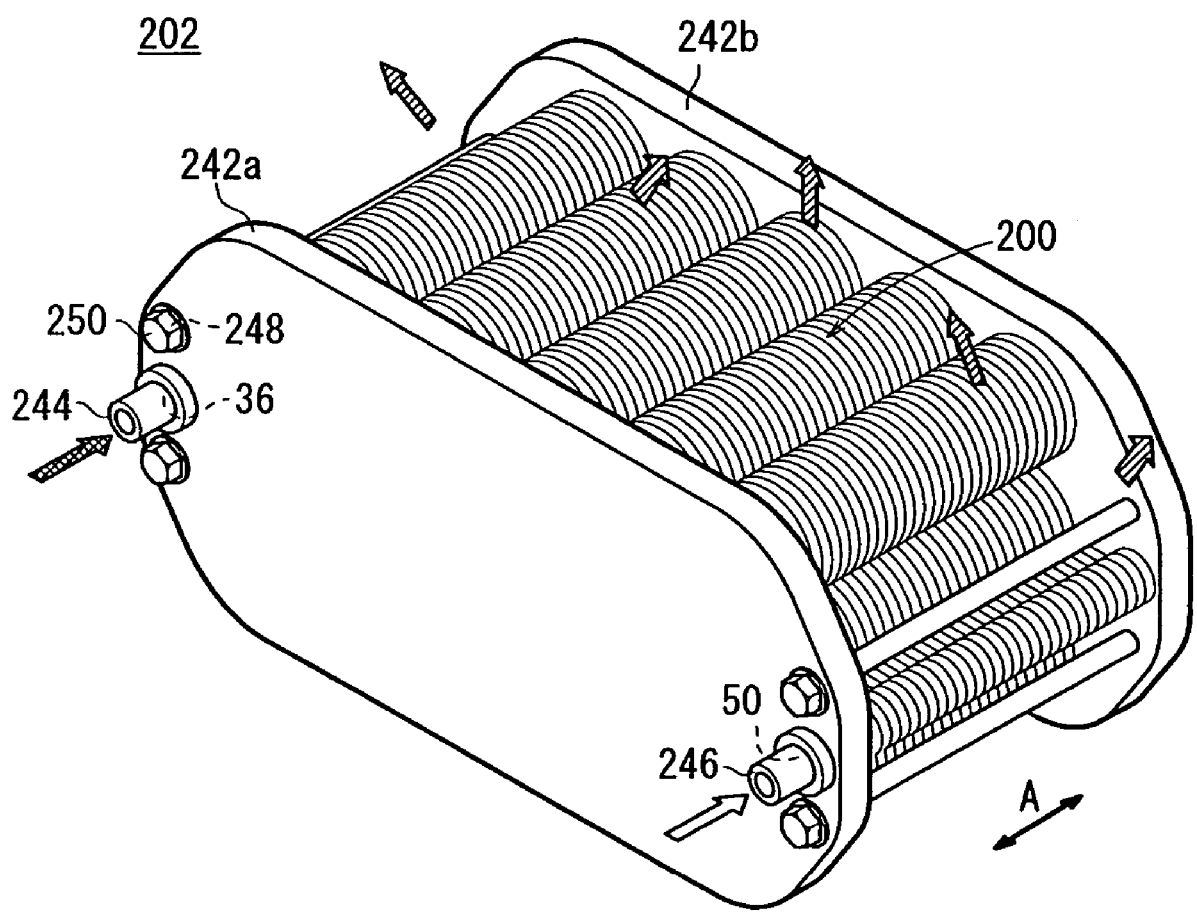
FIG. 18 is a perspective view schematically showing a fuel cell stack formed by stacking a plurality of fuel cells according to a third embodiment of the present invention.
Figure 19:
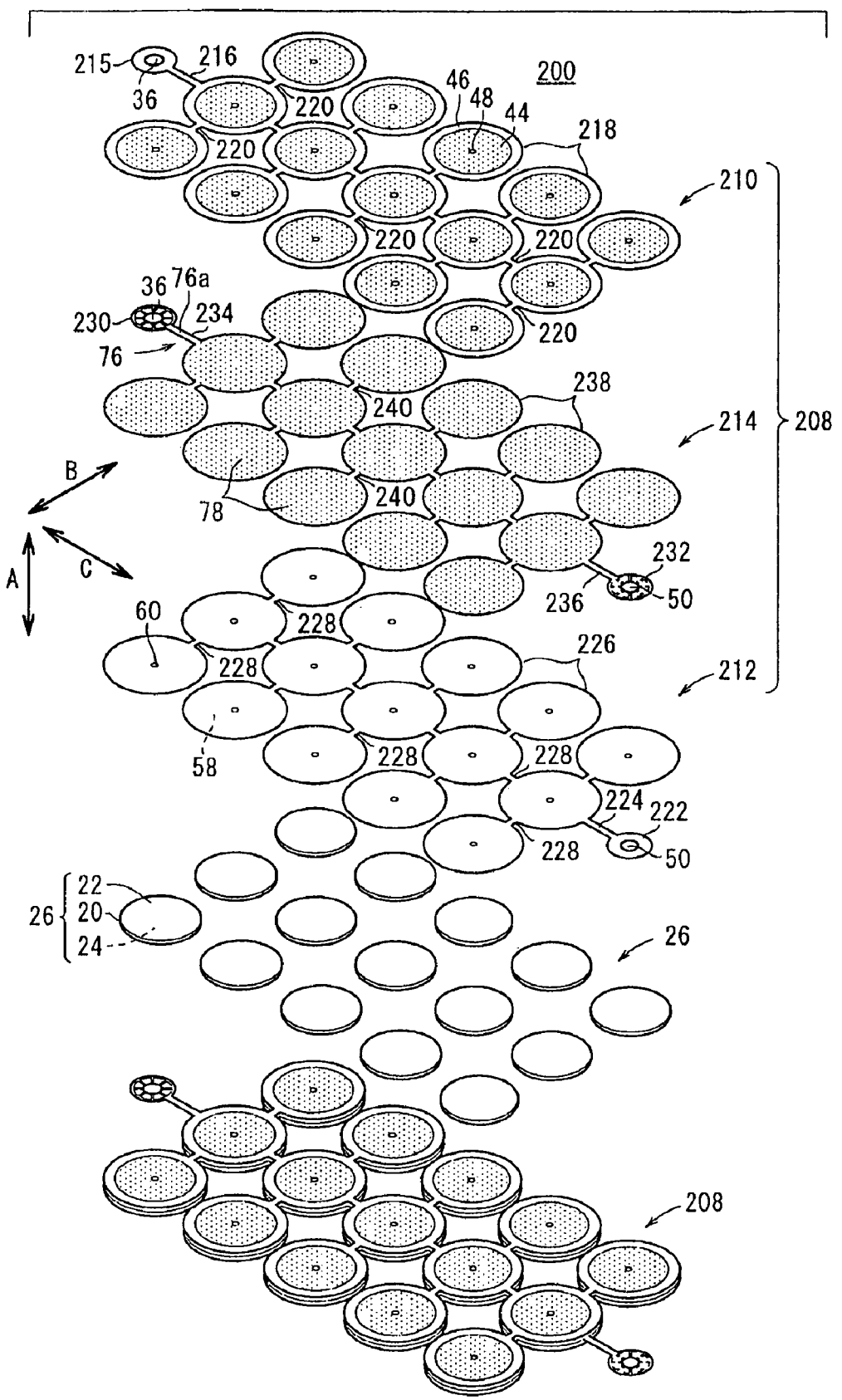
FIG. 19 is an exploded perspective view showing the fuel cell.

FIG. 18 is a perspective view schematically showing a fuel cell stack 202 formed by stacking a plurality of fuel cells 200 according to a third embodiment of the present invention in a direction indicated by an arrow A. FIG. 19 is an exploded perspective view showing the fuel cell 200.

The fuel dell 200 includes a plurality of, e.g., fifteen electrolyte electrode assemblies 26 between a pair of separators 208. Each of the separators 208 includes first and second plates 210, 212 which are stacked together, and a third plate 214 interposed between the first and second plates 210, 212. The first through third plates 210, 212, and 214 are metal plates of, e.g., stainless alloy.

The first plate 210 has a first small diameter end portion 215. The fuel gas supply passage 36 extends through the first small diameter end portion 215. The first small diameter end portion 215 is integral with first circular disks 218 through a narrow bridge 216. The first circular disks 218 are arranged in directions perpendicular to the stacking direction indicated by the arrow A. Three first circular disks 218 are arranged in a direction indicated by an arrow B, and five first circular disks 218 are arranged in a direction indicated by an arrow C. In total, the number of the first circular disks 218 is 15. The first circular disks 218 are connected by bridges 220.

In the embodiment, the first circular disks 218 at opposite ends in the direction indicated by the arrow B are connected to the first circular disk 218 provided at the central position indicated by the arrow B only by the bridges 220. Alternatively, the adjacent first circular disks 218 may be connected with each other in the direction indicated by the arrow C by the bridges 220.

Each of the first circular disks 218 has a plurality of first protrusions 44 and a substantially ring shape protrusion 46 on a surface facing the electrolyte electrode assembly 26. A fuel gas inlet 48 is provided at the center in the surface of the first circular disk 218.

The second plate 212 has a second small diameter end portion 222. The oxygen-containing gas supply passage 50 extends through the second small diameter end portion 222. The second small diameter end portion 222 is integral with second circular disks 226 through a narrow bridge 224.

The second circular disks 226 are connected by bridges 228. As with the first circular disks 218, the second circular disks 226 are arranged in directions perpendicular to the stacking direction indicated by the arrow A. Three second circular disks 226 are arranged in the direction indicated by the arrow B, and five second circular disks 226 are arranged in the direction indicated by the arrow C. In total, the number of the second circular disks 226 is 15. Each of the second circular disks 226 has a plurality of second protrusions 58 on a surface which contacts the cathode 22. An oxygen-containing gas inlet 60 is provided at the center in the surface of the second circular disk 226.

The third plate 214 has a third small diameter end portion 230 and a fourth small diameter end portion 232. The fuel gas supply passage 36 extends through the third small diameter end portion 230, and the oxygen-containing gas supply passage 50 extends through the fourth small diameter end portion 232. The third circular disks 238 are connected to the third and fourth small diameter end portions 230, 232 through bridges 234, 236.

Three third circular disks 238 are arranged in the direction indicated by the arrow B, and five third circular disks 238 are arranged in the direction indicated by the arrow C. In total, the number of the third circular disks 238 is 15. The third circular disks 238 are connected by bridges 240. Each of the third circular disks 238 has a plurality of third protrusions 78 on its surface facing the first plate 210.

Figure 20:
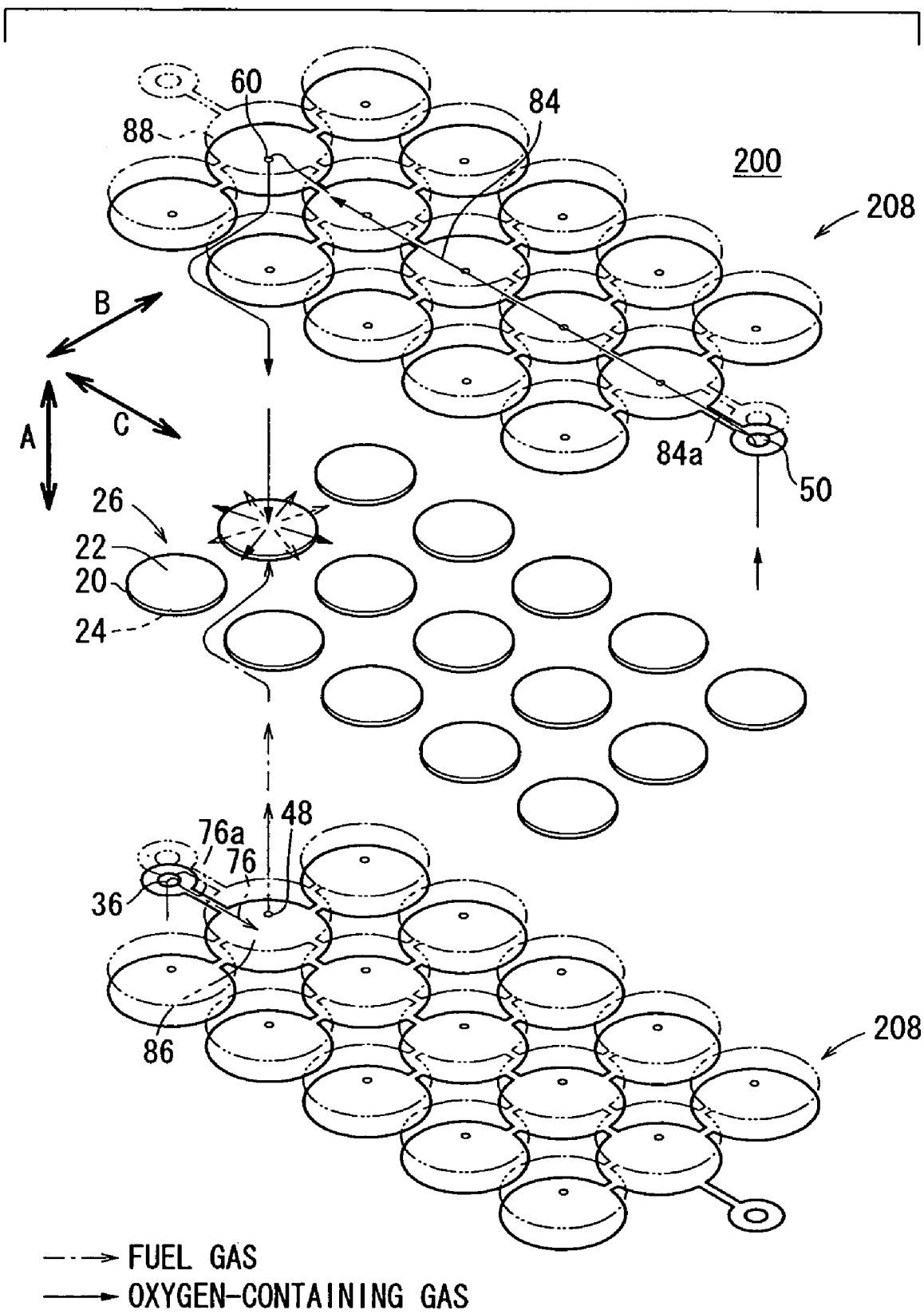
FIG. 20 is an exploded perspective view showing operation of the fuel cell.
Figure 21:
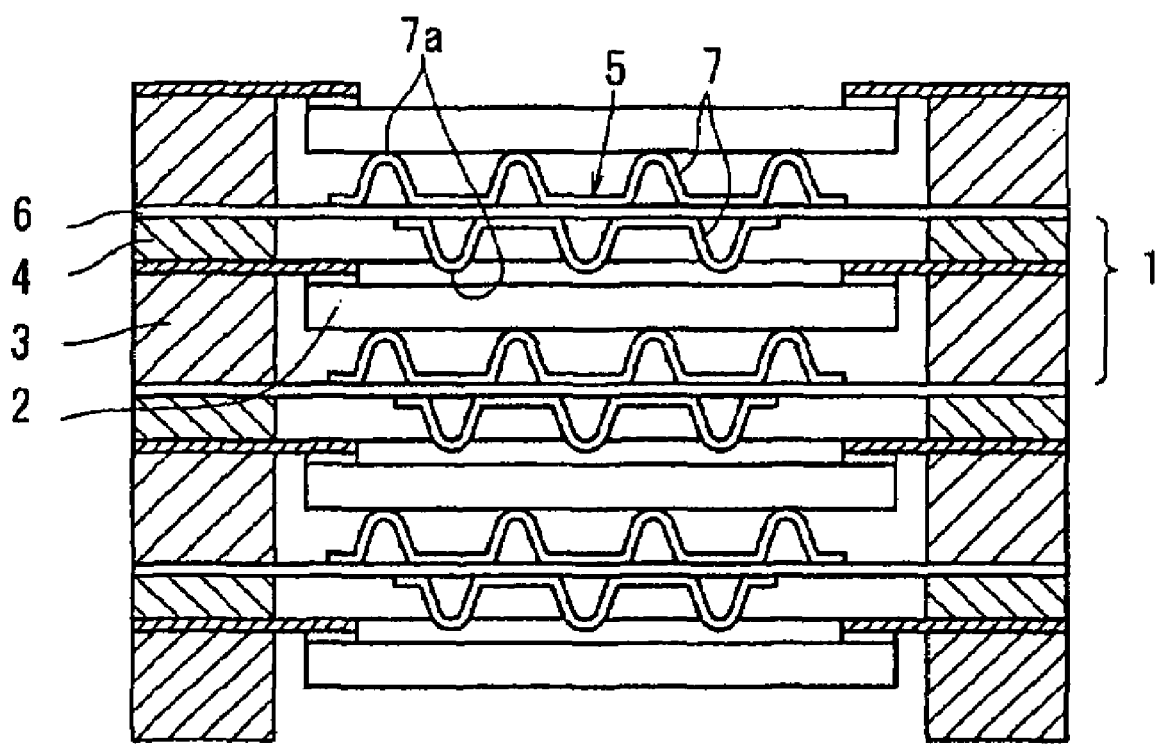
FIG. 21 is a cross sectional view showing a solid oxide fuel cell disclosed in Japanese Laid-Open Patent Publication No. 2001-68132.

The first plate 210 is joined to the third plate 214, e.g., by brazing to form a fuel gas channel 76 between the first plate 210 and the third plate 214. The fuel gas channel 76 includes a fuel gas distribution passage 76*a* between the bridges 216, 234, and a fuel gas pressure chamber 86 between the first and third circular disks 218, 238 (see FIG. 20).

The second plate 212 is joined to the third plate 214, e.g., by brazing, to form an oxygen-containing gas channel 84 between the second plate 212 and the third plate 214. The oxygen-containing gas channel 84 includes an oxygen-containing gas distribution passage 84*a* between the bridges 224, 236, and an oxygen-containing gas pressure chamber 88 between the second and third circular disks 226, 238 (see FIG. 20).

As shown in FIG. 18, the fuel cell stack 202 includes substantially rectangular end plates 242*a*, 242*b* provided at opposite ends of the fuel cells 200 in the stacking direction. A first pipe 244 and a second pipe 246 extend through the end plate 242*a*. The first pipe 244 is connected to the fuel gas supply passage 36, and the second pipe 246 is connected to the oxygen-containing gas supply passage 50. Bolt insertion holes 248 extend through the end plates 242*a*, 242*b*. The fuel gas supply passage 36 is positioned between two bolt insertion holes 248, and the oxygen-containing gas supply passage 50 is positioned between two bolt insertion holes 248. The end plates 242a or the end plate 242b are electrically insulated from bolts 250. The bolts 250 are inserted into bolt insertion holes 248, and tip ends of the bolts 250 are screwed into nuts to tighten the fuel cells 200 of the fuel cell stack 202 together.

In the third embodiment, the first and third plates 210, 214 are joined together to form the fuel gas pressure chamber 86 between the first and third circular disks 218, 238. Further, the second and third plates 212, 214 are joined together to form the oxygen-containing gas pressure chamber 88 between the second and third circular disks 226, 238.

Therefore, the fuel gas from the fuel gas supply passage 36 flows through the fuel gas channel 76, and flows into the fuel gas pressure chamber 86. The internal pressure of the fuel gas pressure chamber 86 is increased, and the fuel gas pressure chamber 86 is expanded. Thus, the first circular disk 218 tightly contacts the entire electrode surface of the anode 24 of the electrolyte electrode assembly 26 under pressure. Likewise, the oxygen-containing gas from the oxygen-containing gas supply passage 50 flows through the oxygen-containing gas channel 84, and the oxygen-containing gas pressure chamber 88. The internal pressure of the oxygen-containing gas pressure chamber 88 is increased, and the oxygen-containing gas pressure chamber 88 is expanded. Thus, the second circular disk 226 tightly contacts the entire electrode surface of the cathode 22 under pressure.

Therefore, with the simple and compact structure, the same advantages as with the first and second embodiments can be obtained. For example, the uniform surface pressure applied between the electrolyte electrode assembly 26 and the first and second circular disks 218, 226 are maintained. Thus, improvement in the power generation efficiency is achieved easily.

The invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell formed by stacking an electrolyte electrode assembly and separators alternately, said electrolyte electrode assembly including an anode, a cathode, and an electrolyte interposed between said anode and said cathode, wherein
    said separator includes first, second and third plates which are stacked together;
    said third plate is provided between said first and second plates for dividing a space between said first and second plates into a fuel gas channel for supplying a fuel gas to said anode, and an oxygen-containing gas channel for supplying an oxygen-containing gas to said cathode;
    said first plate is interposed between said fuel gas channel and said anode to form a fuel gas pressure chamber that expands with an increased internal pressure when said fuel gas is supplied into said fuel gas pressure chamber such that said first plate tightly contacts said anode under pressure;
    said second plate is interposed between said oxygen-containing gas channel and said cathode to form an oxygen-containing gas pressure chamber that expands with an increased internal pressure when said oxygen-containing gas is supplied into said oxygen-containing gas pressure chamber such that said second plate tightly contacts said cathode under pressure; and
    said third plate includes a plurality of protrusions, such that the fuel gas pressure chambers are provided in the recesses defined by the protrusions of the third plate, between said first and third plates.

2. A fuel cell according to claim 1, wherein said first plate has a fuel gas inlet for supplying said fuel gas from said fuel gas pressure chamber toward a central region of said anode; and
    said second plate has an oxygen-containing gas inlet for supplying said oxygen-containing gas from said oxygen-containing gas pressure chamber toward a central region of said cathode.

3. A fuel cell according to claim 1, wherein a fuel gas distribution passage for connecting a fuel gas supply passage and said fuel gas channel is formed between said first and third plates, and said fuel gas before consumption is supplied through said fuel gas supply passage in the stacking direction of said electrolyte electrode assembly and said separators; and
    an oxygen-containing gas distribution passage for connecting an oxygen-containing gas supply passage and said oxygen-containing gas channel is formed between said second and third plates, and said oxygen-containing gas before consumption is supplied through said oxygen-containing gas supply passage in the stacking direction.

4. A fuel cell according to claim 1, wherein said separator further comprises an exhaust gas channel for discharging an exhaust gas after reactions between said oxygen-containing gas and said fuel gas in said electrolyte electrode assembly into said stacking direction of said electrolyte electrode assembly and said separators; and
    a fuel gas channel member for forming said fuel gas channel and supporting said electrolyte electrode assembly, and an oxygen-containing gas channel member for forming said oxygen-containing gas channel and supporting said electrolyte electrode assembly are formed in said exhaust gas channel.

5. A fuel cell according to claim 1, wherein said first and second plates include first and second protrusions protruding in different directions; and
    said first protrusion of one of said separators and said second protrusion of the other of said separators sandwich said electrolyte electrode assembly.

6. A fuel cell according to claim 5, wherein said first and second protrusions function as current collectors for collecting electric energy generated in said electrolyte electrode assembly.

7. A fuel cell stack including a plurality of fuel cells stacked together, and end plates provided at opposite ends in a stacking direction of said fuel cells, said fuel cell each formed by stacking an electrolyte electrode assembly and separators alternately, said electrolyte electrode assembly including an anode, a cathode, and an electrolyte interposed between said anode and said cathode, wherein
    said separator includes first, second and third plates which are stacked together;
    said third plate is provided between said first and second plates for dividing a space between said first and second plates into a fuel gas channel for supplying a fuel gas to said anode, and an oxygen-containing gas channel for supplying an oxygen-containing gas to said cathode;
    said first plate is interposed between said fuel gas channel and said anode to form a fuel gas pressure chamber expands with an increased internal pressure when said fuel gas pressure is supplied into said fuel gas chamber such that said first plate tightly contacts said anode under pressure; and
    said second plate is interposed between said oxygen-containing gas channel and said cathode to form an oxygen-containing gas pressure chamber that expands with an increased internal pressure when said oxygen-containing gas is supplied into said oxygen-containing gas pressure chamber such that said plate tightly contacts said cathode under pressure; and said third plate includes a plurality of protrusions, such that the fuel gas pressure chambers are provided in the recesses defined by the protrusions of the third plate, between said first and third plates.

* * * * *

UNITED STATES PATENT AND TRADEMARK OFFICE
CERTIFICATE OF CORRECTION

PATENT NO. : 7,670,710 B2 Page 1 of 1
APPLICATION NO. : 11/016385
DATED : March 2, 2010
INVENTOR(S) : Tadashi Tsunoda It is certified that error appears in the above-identified patent and that said Letters Patent is hereby corrected as shown below:

On the Title page Item (56)

Second Column, under OTHER PUBLICATIONS, Line 4, please delete "Japanese" and replace it with --Korean--

Signed and Sealed this

Seventh Day of December, 2010

David J. Kappos
*Director of the United States Patent and Trademark Office*